US007261397B2

(12) United States Patent
Morita

(10) Patent No.: US 7,261,397 B2
(45) Date of Patent: Aug. 28, 2007

(54) TANK UNIT, INK JET RECORDING HEAD AND METHOD OF MANUFACTURING TANK UNIT AND INK JET RECORDING HEAD

(75) Inventor: Osamu Morita, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 10/918,441

(22) Filed: Aug. 16, 2004

(65) Prior Publication Data

US 2005/0068381 A1 Mar. 31, 2005

(30) Foreign Application Priority Data

Aug. 19, 2003 (JP) ............................. 2003-295314

(51) Int. Cl.
*B41J 2/17* (2006.01)
*B41J 2/175* (2006.01)

(52) U.S. Cl. .......................................... 347/84; 347/86
(58) Field of Classification Search ................. 347/84, 347/86
See application file for complete search history.

(56) References Cited

U.S. PATENT DOCUMENTS

| 5,342,358 | A | * | 8/1994 | Daikuzono ................... 606/45 |
| 5,930,895 | A | * | 8/1999 | Orikasa et al. .............. 29/890.1 |
| 6,024,442 | A | | 2/2000 | Sato et al. .................... 347/85 |
| 6,120,140 | A | | 9/2000 | Hirosawa et al. ............. 347/93 |
| 6,293,663 | B1 | | 9/2001 | Koshikawa et al. .......... 347/86 |
| 6,338,552 | B1 | | 1/2002 | Sato et al. .................... 347/85 |
| 6,350,025 | B1 | | 2/2002 | Morita et al. ................. 347/86 |
| 6,390,601 | B1 | | 5/2002 | Morita et al. ................. 347/49 |
| 6,398,352 | B1 | | 6/2002 | Morita ......................... 347/86 |
| 6,454,400 | B1 | | 9/2002 | Morita et al. ................. 347/86 |
| 6,631,978 | B1 | | 10/2003 | Watanabe et al. ............. 347/49 |
| 6,705,715 | B2 | | 3/2004 | Morita et al. ................. 347/87 |
| 7,086,723 | B2 | * | 8/2006 | Hara et al. .................... 347/86 |
| 2002/0033858 | A1 | * | 3/2002 | Miyazaki et al. ............. 347/20 |
| 2002/0071002 | A1 | * | 6/2002 | Kawamura et al. .......... 347/50 |
| 2003/0071874 | A1 | * | 4/2003 | Ishizawa et al. ............. 347/50 |
| 2005/0012792 | A1 | * | 1/2005 | Kumagai et al. ............. 347/85 |
| 2005/0110852 | A1 | * | 5/2005 | Lee et al. ..................... 347/97 |
| 2006/0001704 | A1 | * | 1/2006 | Anderson et al. ............ 347/65 |

* cited by examiner

*Primary Examiner*—An H. Do
*Assistant Examiner*—Sarah Al-Hashimi
(74) *Attorney, Agent, or Firm*—Fitzpatrick, Cella, Harper & Scinto

(57) ABSTRACT

A flow path forming member is formed with a recessed portion for forming an ink flow path. A junction surface of the flow path forming member is in a protruded state from a non-junction surface. The flow path forming member is composed of a transparent resin exhibiting transmissivity of laser beam. A tank holder is composed of a non-transmissive resin having no transmissivity of the laser beam. In a state where the flow path forming member is press-connected to the tank holder, the junction surface is welded by irradiating a periphery of the ink flow path with the laser beam from the side of the flow path forming member, thereby forming an ink flow path. Provided is an ink jet recording head in which the tank holder and the flow path forming member that serve to form the ink flow path are surely connected by a small number of steps without producing foreign matters within the ink flow path.

8 Claims, 19 Drawing Sheets

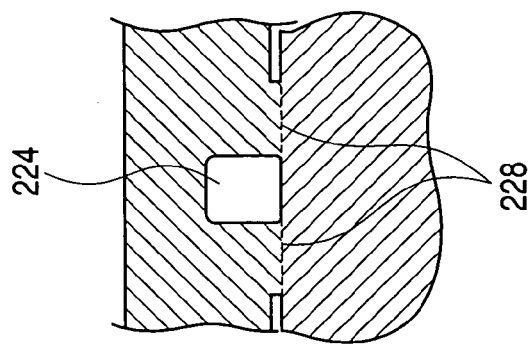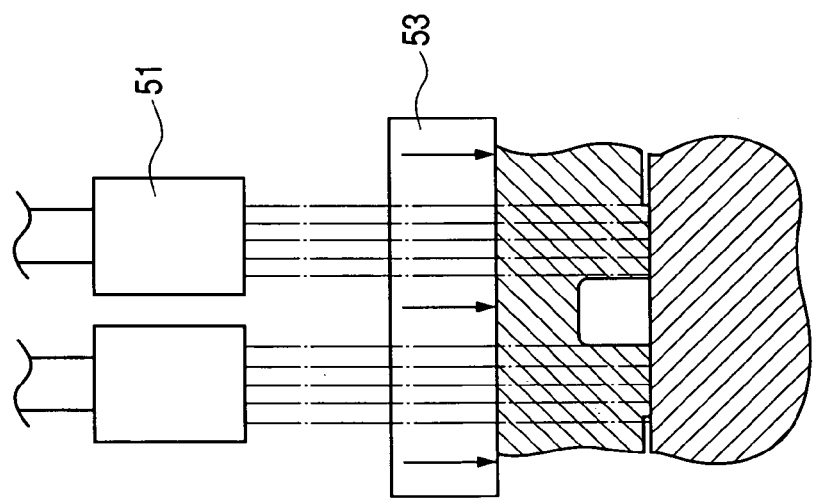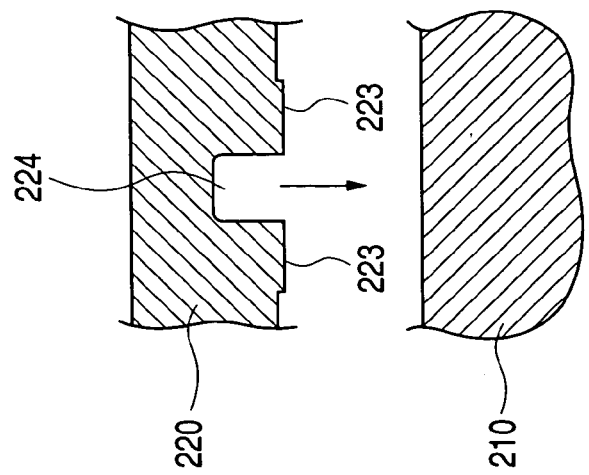

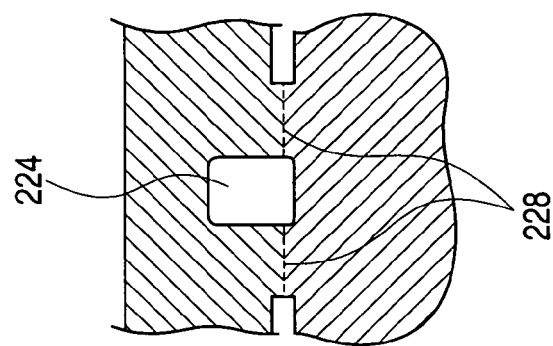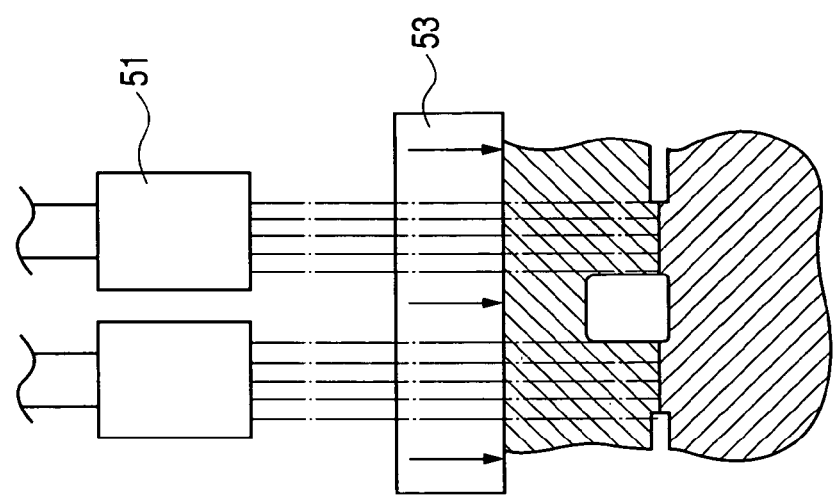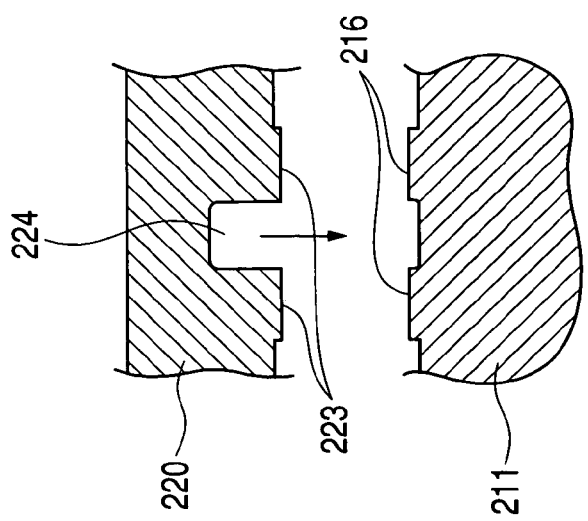

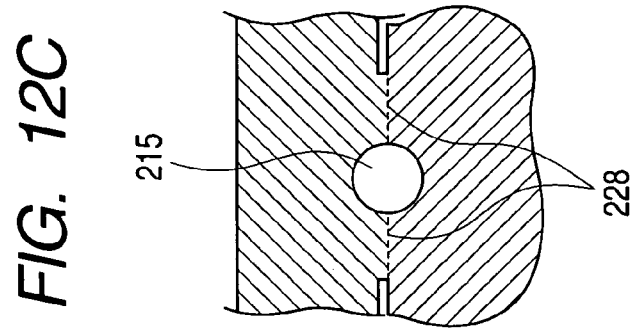
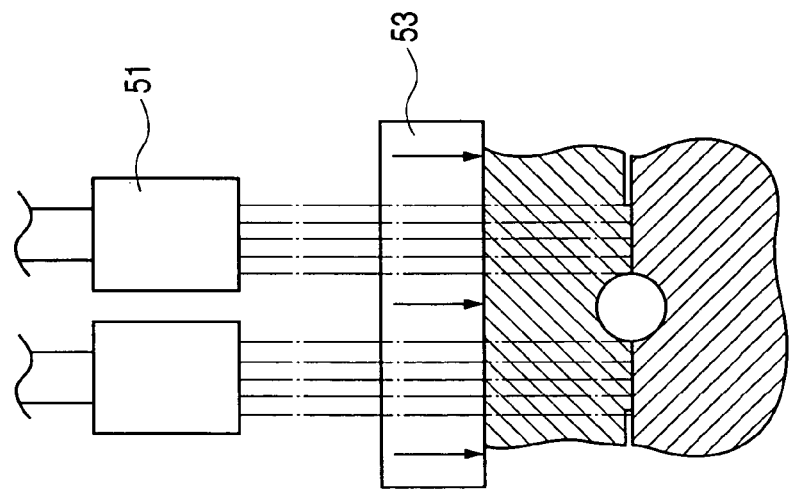
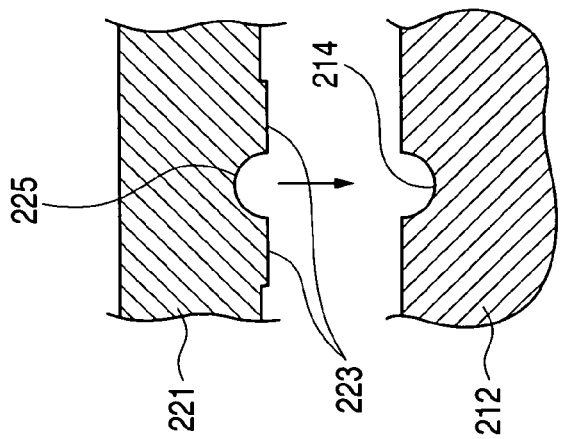

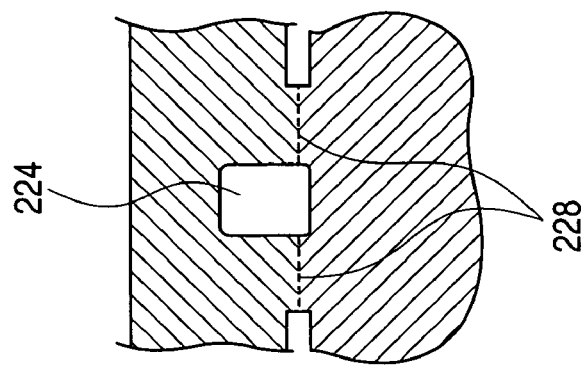
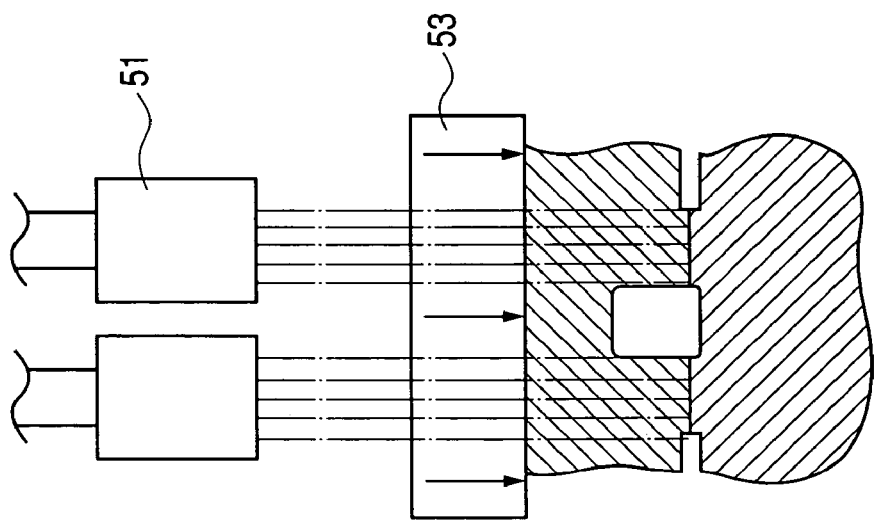
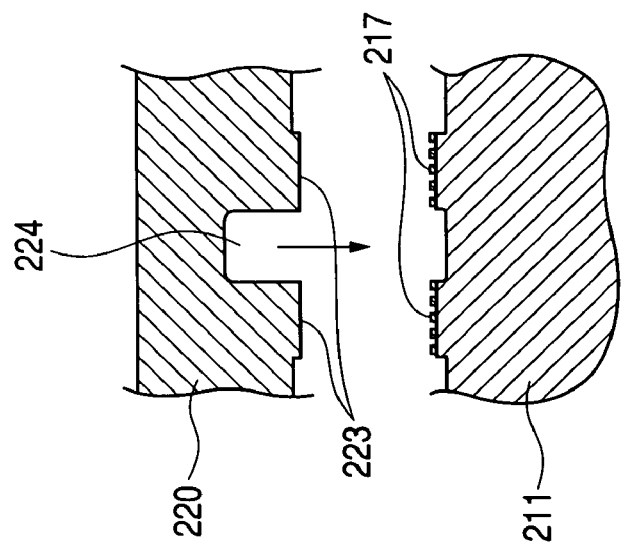

TANK UNIT, INK JET RECORDING HEAD AND METHOD OF MANUFACTURING TANK UNIT AND INK JET RECORDING HEAD

BACKGROUND OF THE INVENTION

1. Field of the Invention

The present invent relates to an ink jet recording head of an ink jet recording apparatus that performs recording by discharging inks.

2. Description of the Related Art

FIG. 17 shows an exploded perspective view for explaining a construction of a conventional ink jet recording head. FIG. 18 shows a cross sectional view of a recording head cartridge in which an ink tank is installed in the ink jet recording head. FIGS. 19A through 19C show schematic sectional enlarged views for explaining a step of forming an ink flow path.

An ink jet recording head 1020 shown in FIGS. 17 and 18 has hitherto used a method of assembling a tank holder unit 1200 by ultrasonic-wave-welding an flow path forming member 1220 to a tank holder 1210 in order to form an ink flow path 1214 for guiding an ink in an ink tank 1040 to a recording element unit 1300 via the tank holder 1201.

As shown in FIG. 18, in a state where the ink tank 1040 is installed in the ink jet recording head 1020, the ink is supplied into the ink jet recording head 1020 via a joint portion including a filter 1230 and a seal rubber 1240 from an ink supply port 1401 of the ink tank 1040. The ink is supplied to a recording element substrate 1330 of the recording element unit 1300 via the ink flow path 1214, and is then discharged onto a recording sheet (unillustrated) by dint of energy generated by energy elements (unillustrated) within a silicon substrate.

At this time, the ink flow path 1224 is formed by connecting the flow path forming member 1220 to the tank holder 1210 by the ultrasonic wave welding. To explain an assembling step with reference to FIGS. 19A through 19C, the tank holder 1210 is, as shown in FIG. 19A, formed with a groove serving as a burr reservoir 1218 in a connecting portion, while the flow path forming member 1220 is formed with a welding rib 1227 on the connecting portion. As shown in FIG. 19B, the flow path forming member 1220 is placed on the tank holder so that the welding rib 1227 is fitted into the groove of the burr reservoir 1218. Further, the flow path forming member 1220 is pressed from above by an ultrasonic wave welding horn 1054, and ultrasonic waves are oscillated while applying a pressure. With the oscillations, as shown in FIG. 19C, the welding rib 1227 spreads in the burr reservoir 1218 while being melted, and the tank holder 1210 and the flow path forming member 1220 are thus firmly connected together, thereby forming the ink flow path 1224.

Note that the numeral 1310 represents a first plate, 1311 designates an ink supply port formed in the first plate, 1320 denotes a second plate, 1330 stands for a recording element substrate, 1337 represents a discharge port formed in the recording element substrate, 1340 indicates an electric wiring board, and 1341 designates an external signal input terminal for electrically connecting the ink jet recording head to the ink jet recording apparatus in FIGS. 17 and 18. The first plate 1311 is connected to the flow path forming member 1220 and supports the recording element substrate 1330 and the second plate 1320 as well. The second plate 1320 supports the electric wiring board 1340. These members constitute the recording element unit 1300.

SUMMARY OF THE INVENTION

The method described so far is a rational method as a means for surely forming an airtight ink flow path in a short period of time at a low cost. In the prior art described above, however, the burrs melted out of the welding rib 1227 by the oscillations of the ultrasonic waves bulge over the ink flow path 1224 from the burr reservoir 12218, with the result that fine resinous grains are fragmented into pieces of dusts and clog in the ink discharge port 1337 of the recording element substrate 1330. This results in a discharge defect of the ink and might cause a decline of reliability on the ink jet recording head 1020.

For eliminating the dusts produced by the resin burrs, the ink flow path 1224 is washed in a subsequent washing step. The burr reservoir 1218 is not, however, all filled with the welded burrs, and a slight gap is left and becomes a stagnated portion when flowing the wash water. Then, a washing pressure of the wash water is hard to be exerted, and a considerably long period of time is required for completely flowing the dusts away. This makes it impossible to reduce assembly time and is a factor for raising the costs.

Moreover, the flow path forming member 1220 is provided with a protruded portion of the ultrasonic wave welding rib 1227, and the tank holder 1201 is formed with the recessed portion as the burr reservoir 1218. Therefore, a gap between the adjacent ink flow paths must be set equal to or larger than approximately 1.5 mm. As a result, there arises such inconvenience that the ink flow paths can not be disposed at a high density, and hence it is difficult to downsize the ink jet recording head.

On the other hand, Japanese Patent Application Laid-Open Publication No.8-183182 and U.S. Pat. No. 5,808,641 disclose technologies, wherein a resinous top board having a plurality of discharge ports and a plurality of liquid flow paths and a substrate for generating discharge energy, are integrally welded by irradiation of the laser beams. These technologies prevent such inconvenience that liquid discharge performance is declined by a distortion caused on the resinous top board and by resultant deformations of the liquid flow paths and the discharge ports as happened in the conventional method for making the resinous top board and the substrate integral by pressing the resinous top board against the substrate through an elastic member.

The sure welding of this resinous top board to the substrate, however, involves providing a resinous film on a welding surface on the substrate beforehand, and a resinous film adhering step therefor is incorporated into the substrate manufacturing step. This leads to an increase in the cost for the substrate.

It is an object of the present invention to provide an ink jet recording head, wherein a connection between a tank holder (which will hereinafter also be called a "container holding member") for forming an ink flow path (which will hereinafter referred to also as a "liquid flow path") and a flow path forming member, is conducted surely in a small number of steps at a short interval between flow paths without producing foreign matters within the ink flow path.

According to one aspect of the present invention, an ink jet recording head comprises a container holding member to which a liquid accommodating container for accommodating a liquid is attached, and a flow path forming member connected to the container holding member, and a plurality of liquid flow paths linked to the liquid accommodation container are formed between the container holding member and the flow path forming member that have been connected together. Further, at least one of the container holding member and the flow path forming member is formed with a recessed portion for forming the liquid flow path, at least one of a junction surface portion of the container holding member and a junction surface portion of the flow path forming member has a protruded portion assuming a protruded shape from non-connected surfaces of the members having the junction surface portions. Moreover, the flow path forming member is composed of a resin exhibiting transmissivity of laser beam, a non-transmissive material exhibiting none of transmissivity of the laser beam exists in at least a junction area of the container holding member between the container holding member and the flow path forming member, the non-transmissive material emits heat by irradiating a periphery of the ink flow path with the laser beam from the side of the flow path forming member in a state where the flow path forming member is pressure-welded to the container holding member, and the junction surface portion of the container holding member and the junction surface portion of the flow path forming member are welded, thereby forming the liquid flow path.

According to another aspect of the present invention, there is provided a method of manufacturing an ink jet recording head comprising a container holding member to which a liquid accommodating container for accommodating a liquid is attached, and a flow path forming member connected to the container holding member, wherein a plurality of liquid flow paths communicating with the liquid accommodation container are formed between the container holding member and the flow path forming member that have been connected together. The ink jet recording head manufacturing method comprises a preparing step of the container holding member and the flow path forming member, in which at least one of the container holding member and the flow path forming member is formed with a recessed portion for forming the liquid flow path, at least one of a junction surface portion of the container holding member and a junction surface portion of the flow path forming member has a protruded portion assuming a protruded shape from non-connected surfaces of the members having the junction surface portions, a press-connecting step of press-connecting the container holding member and the flow path forming member in a state where a non-transmissive material exhibiting none of transmissivity of the laser beam exists in at least a junction area between the container holding member and the flow path forming member, and a welding step of irradiating a periphery of the ink flow path with the laser beam from the side of the flow path forming member composed of a resin having transmissivity of the laser beam in a state where the flow path forming member and the container holding member are press-connected to each other, thus heating the non-transmissive material, then welding the junction surface portion of the container holding member and the junction surface portion of the flow path forming member by this heating, and thus forming the liquid flow path.

At least one surface of the junction surfaces in the periphery of the portions formed with the liquid flow paths of the container holding member and of the flow path forming member, is formed in the protruded shape from the non-junction surfaces. The flow path forming member is composed of the transparent resin having the transmissivity of the laser beam. The non-transmissive material having no transmissivity of the laser beam exists in at least the junction surface area of the container holding member. In the state where the flow path forming member is press-connected to the container holding member, the junction surface is welded by irradiating the periphery of the liquid flow path with the laser beam from the side of the flow path forming member, thereby forming the liquid flow path. The method, which is simple and attained at a low cost, provides the ink jet recording head capable of designing a high-density layout of the liquid flow paths with neither occurrence of the dusts of the resinous materials composing the container holding member and the flow path forming member nor formation of the stagnated portion within the liquid flow path.

As described above, the present invention yields an effect that the method, which is simple and attained at the low cost, enables the formation of the ink jet recording head capable of designing the high-density layout of the liquid flow paths with neither the occurrence of the dusts of the resinous materials composing the container holding member and the flow path forming member nor formation of the stagnated portion within the ink flow path.

The following is the reason for this. At least one surface of the junction surfaces in the periphery of the portions formed with the liquid flow paths of the tank holder and of the flow path forming member, is formed in the protruded state from the non-junction surfaces. The flow path forming member is composed of the transparent resin having the transmissivity of the laser beam. The non-transmissive material having no transmissivity of the laser beam exists in at least the junction surface area of the tank holder. In the state where the flow path forming member is press-connected to the tank holder, the junction surface portions of the tank holder and of the flow path forming member are welded by irradiating the periphery of the ink flow path with the laser beam from the side of the flow path forming member, thereby forming the liquid flow path.

BRIEF DESCRIPTION OF THE DRAWINGS

FIG. 3A corresponds to FIG. 1; FIG. 3B corresponds to FIG. 2;

FIGS. 4A, 4B and 4C are schematic side surface partial sectional views showing a step of bonding the flow path forming member to the tank holder of the ink jet recording head in the first embodiment of the present invention; FIG. 4A shows a relative relationship between the tank holder and the flow path forming member before being bonded; FIG. 4B shows a state of irradiating the flow path forming member with the laser beams in a way that abuts the flow path forming member on the tank holder; FIG. 4C shows a bonded state;

FIG. 5A shows an assembled state; FIG. 5B shows a state where the ink tanks are removed;

FIGS. 11A, 11B and 11C are schematic side surface partial sectional views showing a step of connecting the flow path forming member to the tank holder of the ink jet recording head in a second embodiment of the present invention; FIG. 11A shows a relative relationship between the tank holder and the flow path forming member before the connection; FIG. 11B shows a state in which the flow path forming member is irradiated with the laser beam in a way that abuts the flow path forming member on the tank holder; FIG. 11C shows a connected state;

FIGS. 12A, 12B and 12C are schematic side surface partial sectional views showing a step of connecting the flow path forming member to the tank holder of the ink jet recording head in a third embodiment of the present invention; FIG. 12A shows a relative relationship between the tank holder and the flow path forming member before the connection; FIG. 12B shows a state in which the flow path forming member is irradiated with the laser beam in a way that abuts the flow path forming member on the tank holder; FIG. 12C shows a connected state;

FIG. 15A shows a relative relationship between the tank holder and the flow path forming member before the connection; FIG. 15B shows a state in which the flow path forming member is irradiated with the laser beam in a way that abuts the flow path forming member on the tank holder; FIG. 15C shows a connected state;

FIGS. 16A, 16B and 16C are schematic side surface partial sectional views showing a step of connecting the flow path forming member to the tank holder of the ink jet recording head in a fifth embodiment of the present invention; FIG. 16A shows a relative relationship between the tank holder and the flow path forming member before the connection; FIG. 16B shows a state in which the flow path forming member is irradiated with the laser beam in a way that abuts the flow path forming member on the tank holder; FIG. 16C shows a connected state;

FIG. 19A shows a relative relationship between the tank holder and the flow path forming member before the connection; FIG. 19B shows a state in which an ultrasonic wave welding horn is oscillated in such a way that the flow path forming member is made contiguous to the tank holder and is pressed from above by the ultrasonic wave welding horn; FIG. 19C shows a connected state.

DESCRIPTION OF THE PREFERRED EMBODIMENTS

Figure 1:
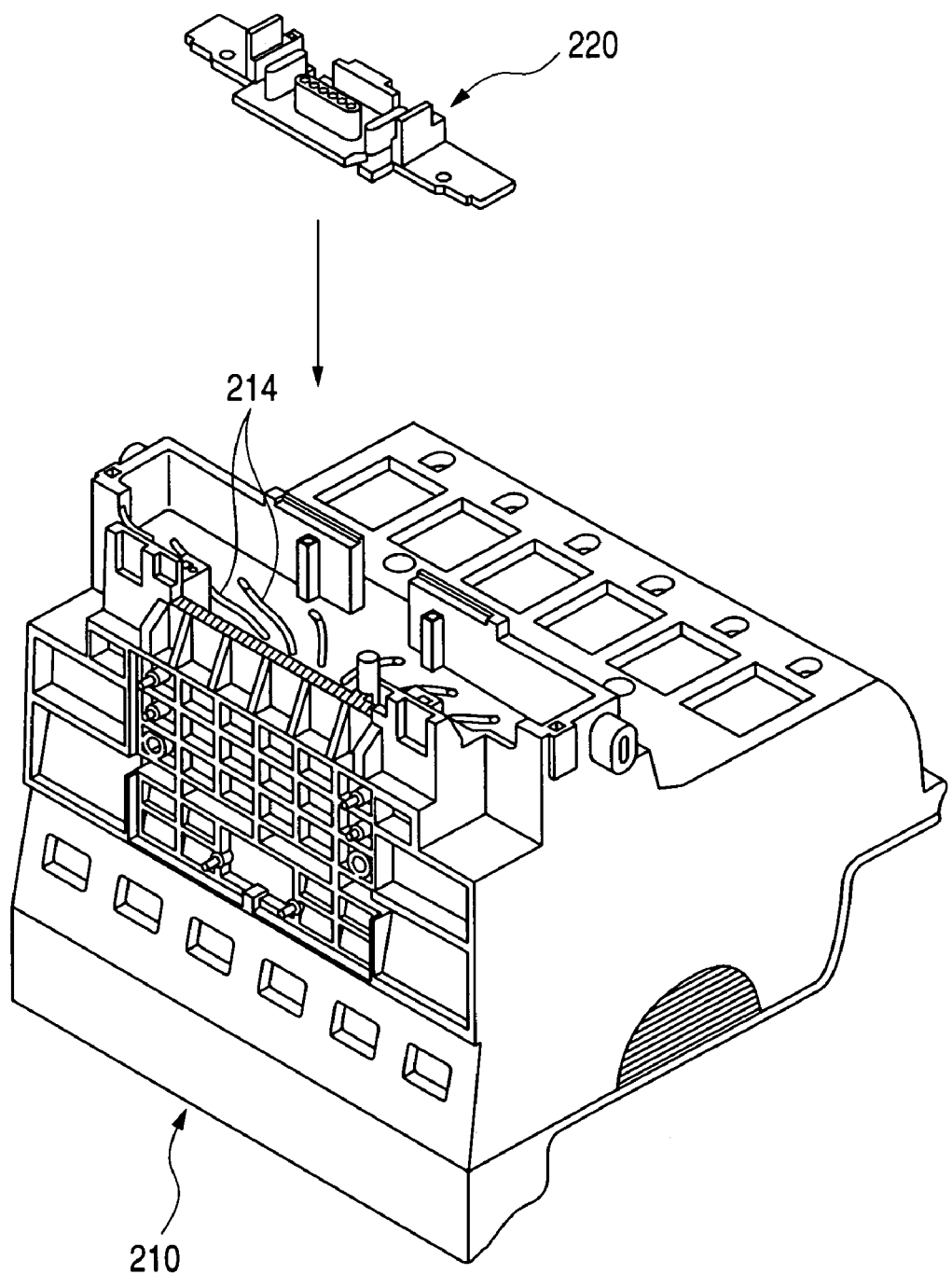
FIG. 1 is a schematic perspective view showing a step of attaching a flow path forming member to a tank holder of an ink jet recording head in a first embodiment of the present invention.
Figure 2:
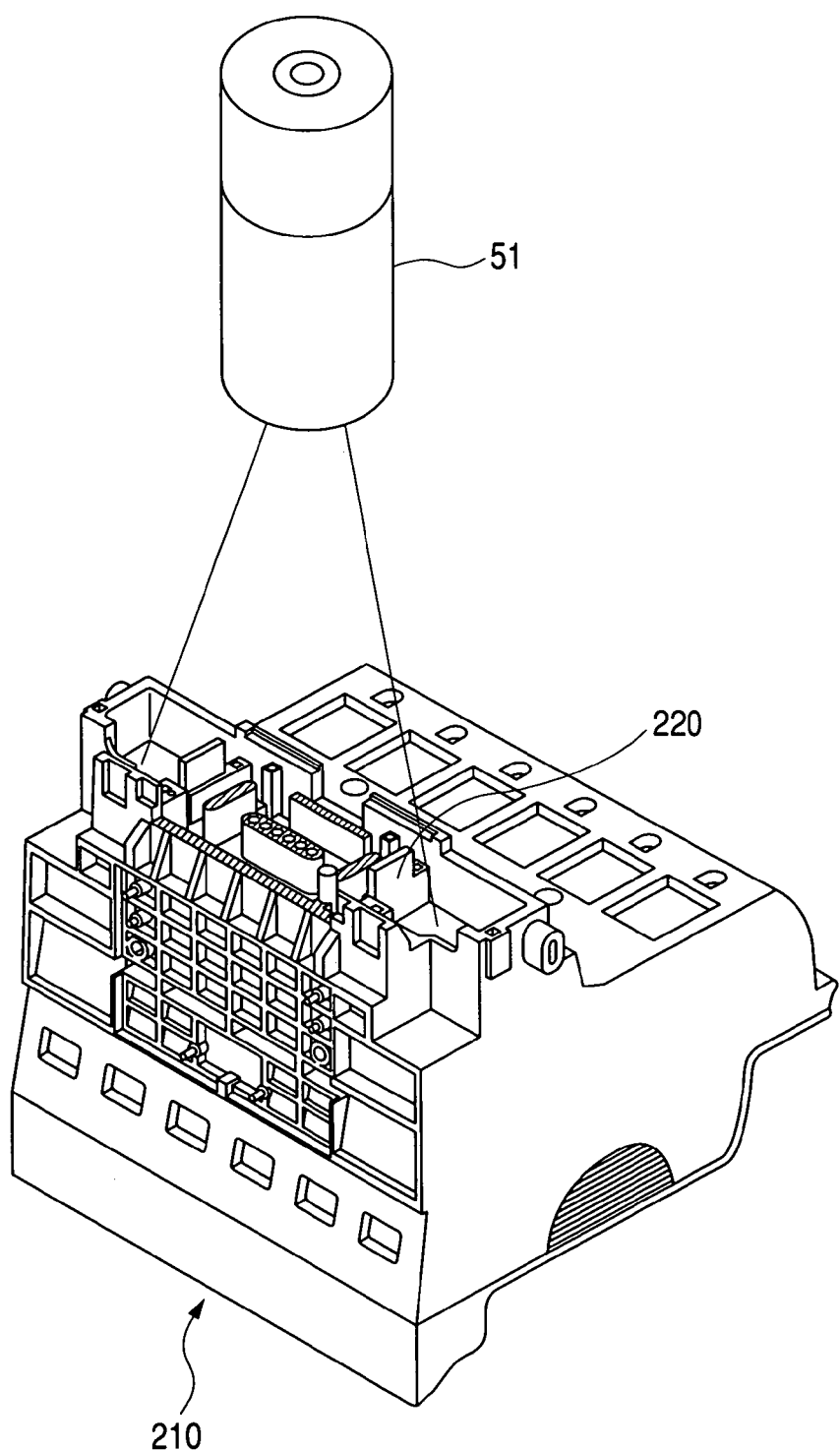
FIG. 2 is a schematic perspective view showing a step of irradiating, with laser beams, the flow path forming member attached to the tank holder of the ink jet recording head in the first embodiment of the present invention.
Figure 3A:
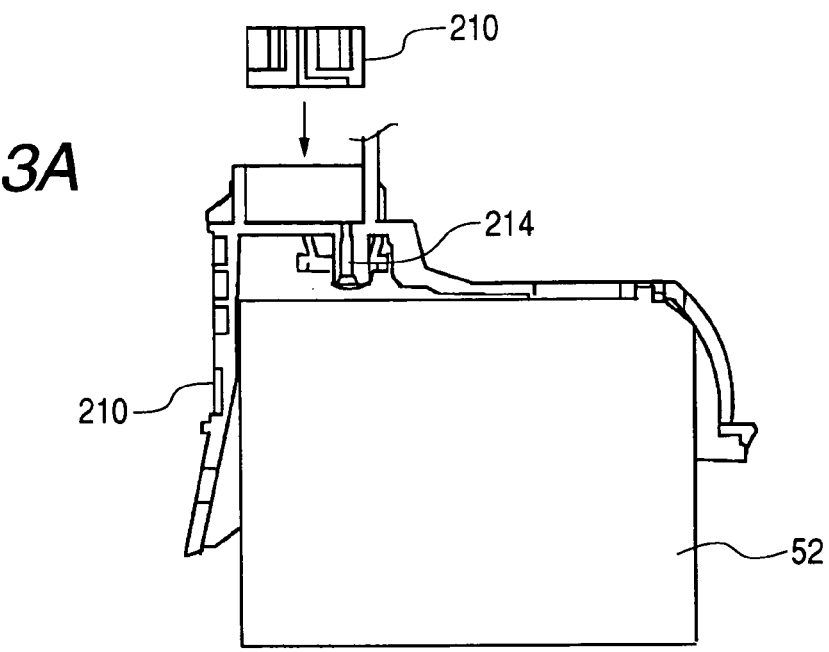
FIGS. 3A and 3B are schematic side sectional views of FIGS. 1 and 2.
Figure 3B:
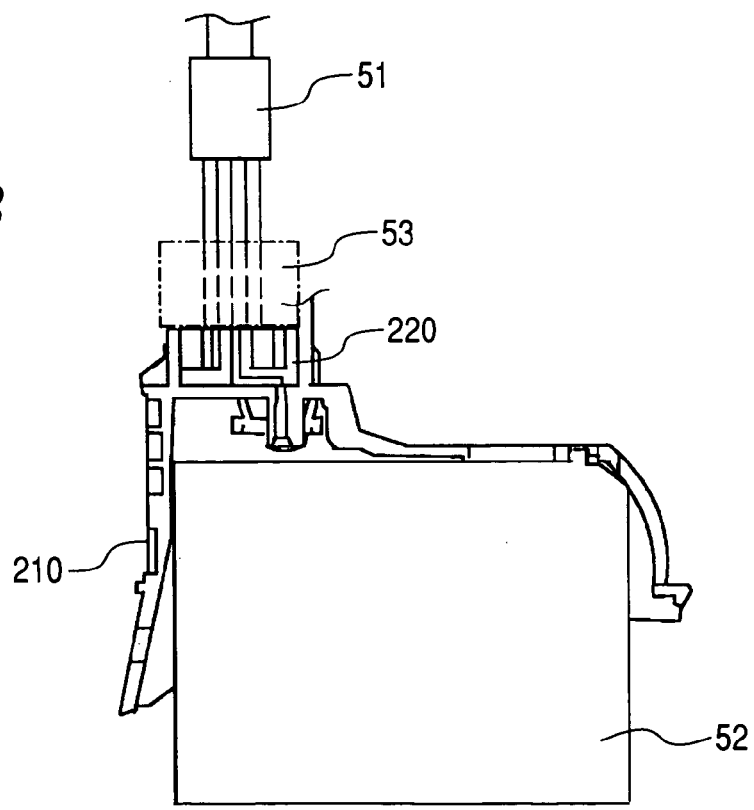

Embodiments of the present invention will be described in detail with reference to the drawings. FIG. 1 is a perspective view showing a step of attaching a flow path forming member to a tank holder of an ink jet recording head in a first embodiment of the present invention. FIG. 2 is a schematic perspective view showing a step of irradiating, with laser beams, the flow path forming member attached to the tank holder of the ink jet recording head in the first embodiment of the present invention. FIGS. 3A and 3B are schematic side views of FIGS. 1 and 2. FIG. 3A corresponds to FIG. 1, while FIG. 3B corresponds to FIG. 2. FIGS. 4A, 4B and 4C are schematic sectional views of side surfaces, showing a step of bonding the flow path forming member to the tank holder of the ink jet recording head in the first embodiment of the present invention. FIG. 4A shows a relative relationship between the tank holder and the flow path forming member before being bonded. FIG. 4B shows a state of irradiating the flow path forming member with the laser beams in a way that abuts the flow path forming member on the tank holder. FIG. 4C shows a bonded state.

Figure 5B:
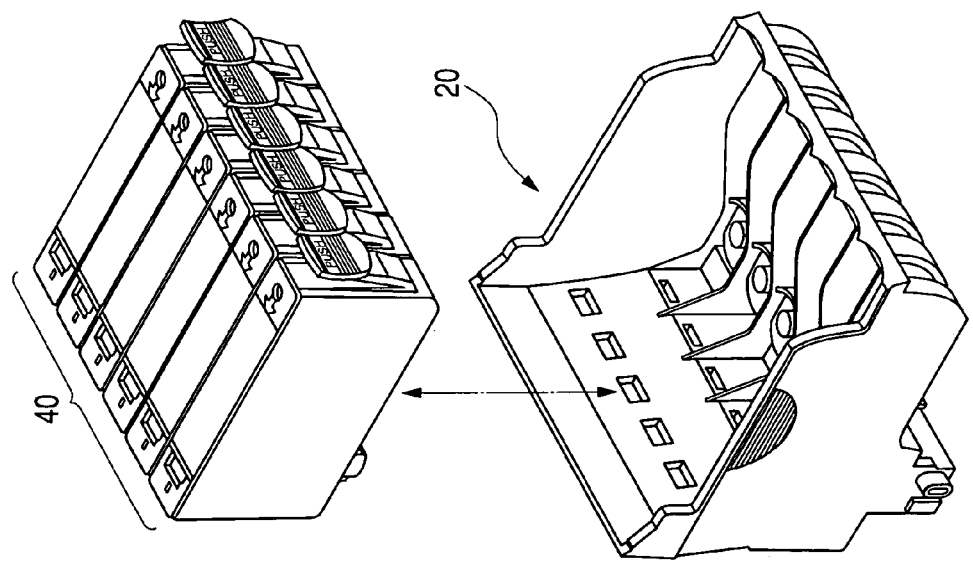
FIGS. 5A and 5B are perspective views of a recording head cartridge.
Figure 5A:
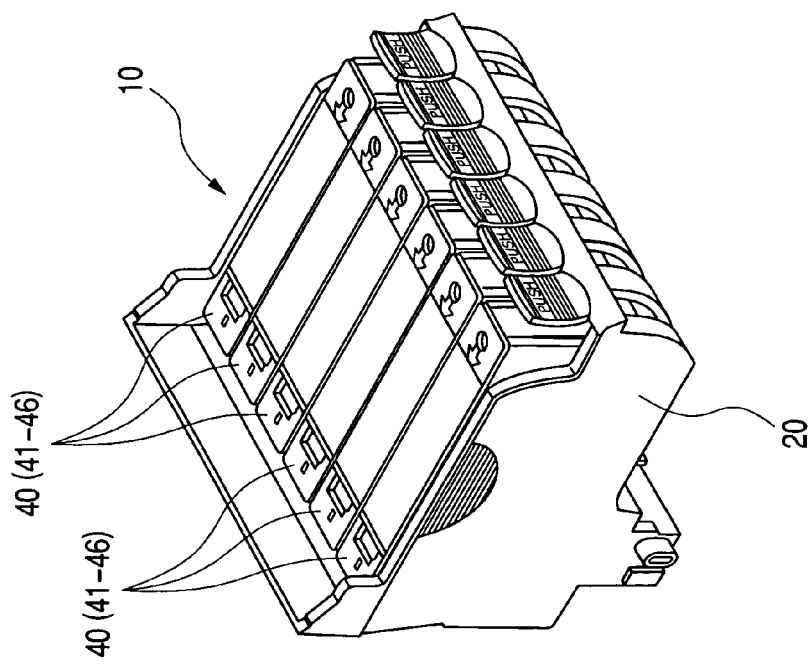
Figure 6:
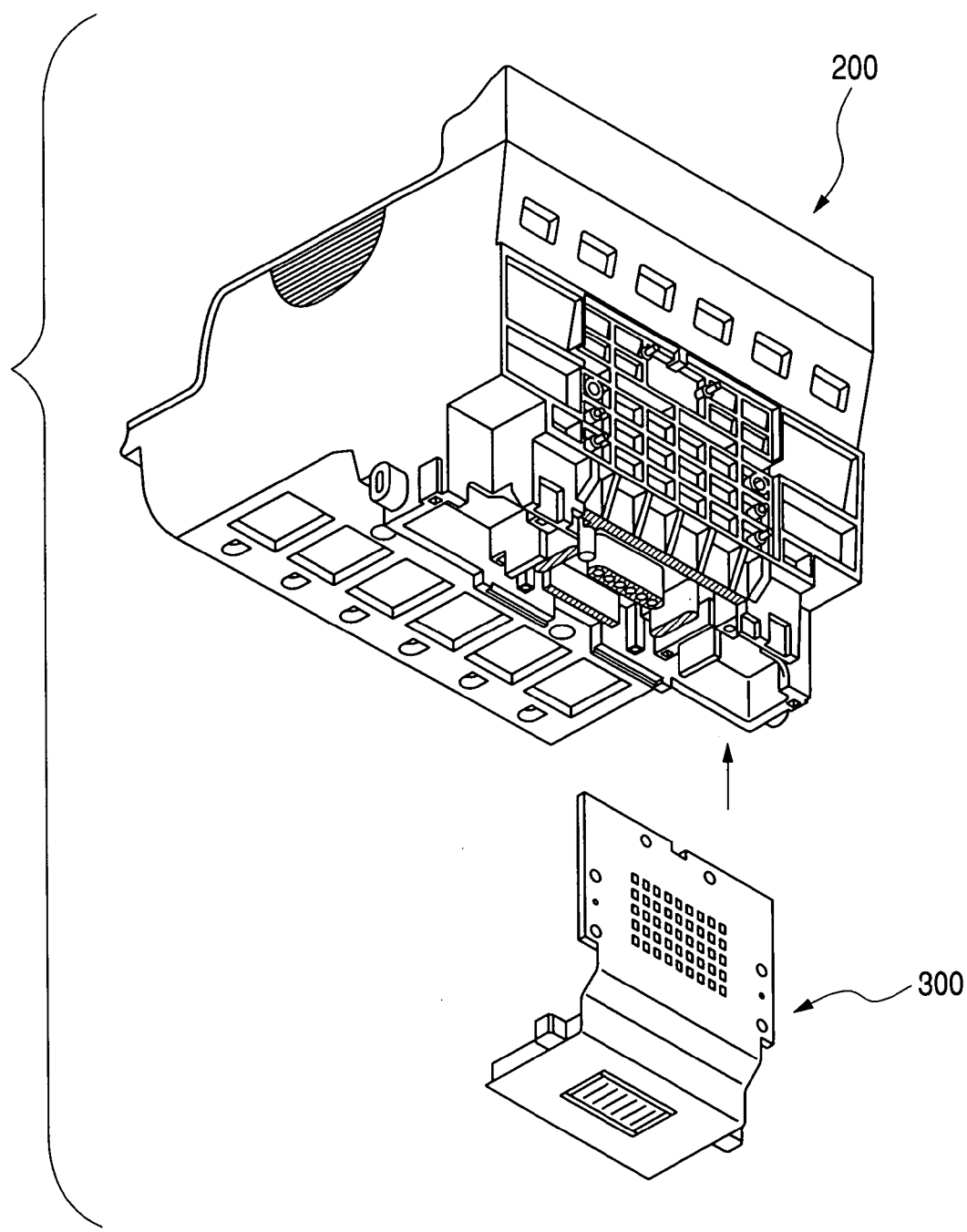
FIG. 6 is a perspective view of a tank holder unit and a recording element unit of the ink jet recording head.
Figure 7:
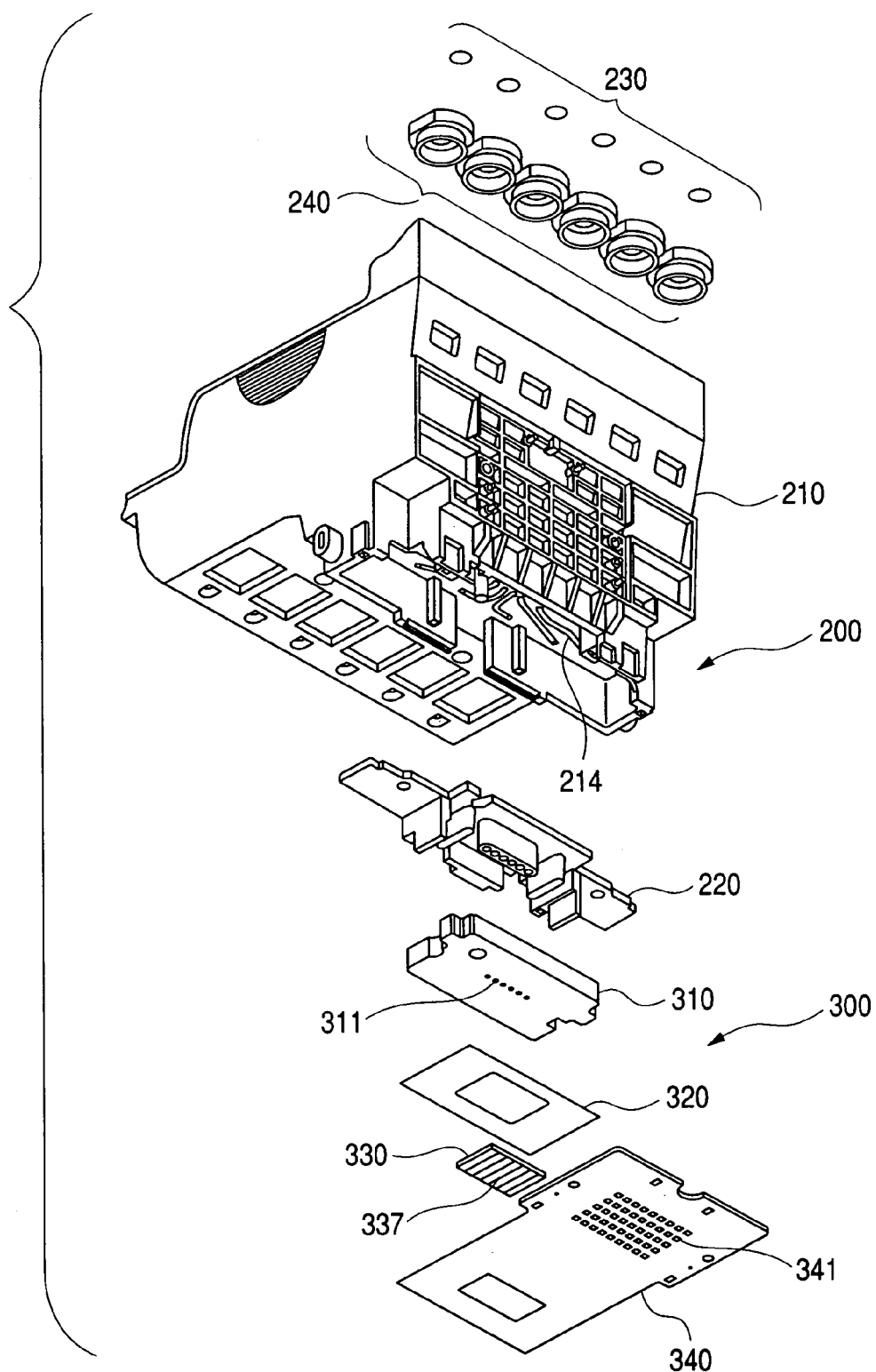
FIG. 7 is a schematic exploded perspective view of the ink jet recording head.
Figure 8:
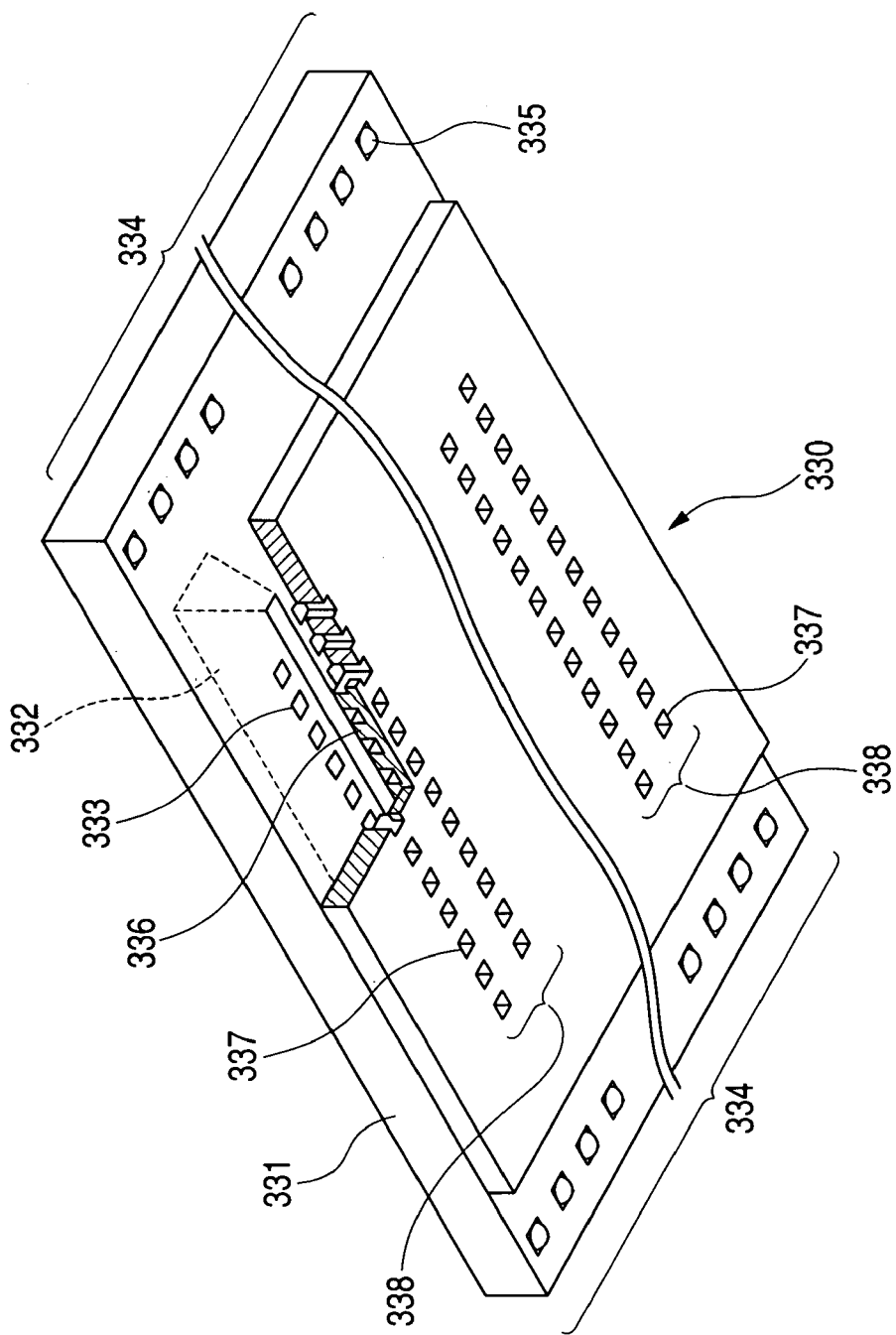
FIG. 8 is a schematic partially cut perspective view of a recording element substrate constituting a recording element unit.
Figure 9:
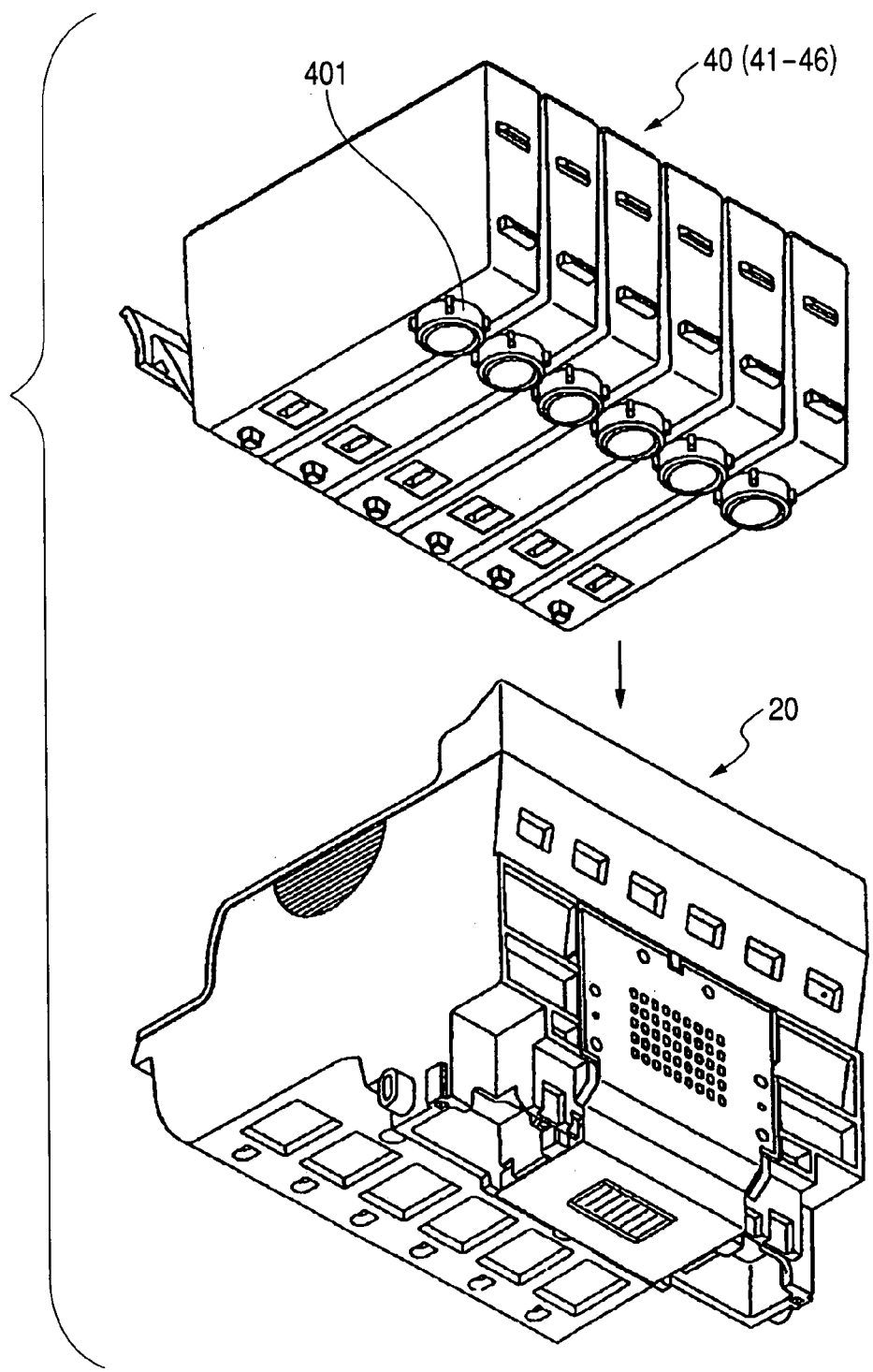
FIG. 9 is a schematic perspective view showing a relationship between the ink jet recording head and the ink tanks.

The discussion will start with explaining a construction of the ink jet recording head in the first embodiment of the present invention and a relationship between related pieces of components such as a recording head cartridge, ink tanks, an ink jet recording apparatus body and a carriage. FIGS. 5 through 9 are explanatory views therefor. FIGS. 5A and 5B are perspective views of the recording head cartridge. FIG. 5A shows an assembled state. FIG. 5B shows a state where the ink tanks are removed. FIG. 6 is a perspective view of a tank holder unit and a recording element unit of the ink jet recording head. FIG. 7 is a schematic exploded perspective view of the ink jet recording head. FIG. 8 is a schematic partially cut perspective view of a recording element substrate constituting the recording element unit. FIG. 9 is a schematic perspective view showing a relationship between the ink jet recording head and the ink tanks. Configurations of the respective portions will hereinafter be explained with reference to the drawings.

An ink jet recording head 20 of the present invention is, as can be understood from the perspective views in FIGS. 5A and 5B, one component configuring a recording head cartridge 10. The recording head cartridge 10 is constructed of the ink jet recording head 20 and ink tanks 40 (41, 42, 43, 44, 45, 46) defined as liquid accommodation containers so provided as to be detachably attached to the ink jet recording head 20. This recording head cartridge 10 is fixedly supported by a positioning means and an electric contact of the carriage mounted on the unillustrated ink jet recording apparatus body, and is detachable from and attachable to this carriage. The ink tank 41 is provided for containing a black ink. The ink tank 42 is for a light cyan ink. The ink tank 43 is for a light magenta ink. The ink tank 44 is for a cyan ink. The ink tank 45 is for a magenta ink. The ink tank 46 is for a yellow ink. Thus, the ink tanks 41, 42, 43, 44, 45 and 46 are each detachably attached to the ink jet recording head 20 and also replaceable. This construction leads to a decrease in print running costs in the ink jet recording apparatus. The recording head cartridge, the ink jet recording head, the ink tanks, the ink jet recording apparatus body and the carriage, which are shown in FIGS. 5 through 9, have configurations to which a variety of novel technologies established at a stage of accomplishing the present invention were applied, and hence the whole construction will be described in a way that briefly explains their configurations.

(1) Explanation of Inkjet Recording Head

The ink jet recording head 20 is an ink jet recording head classified as a side shooter type in a bubble jet system, wherein recording is conducted by use of an electro-thermal converting element for generating thermal energy for producing film boiling for the ink in accordance with an electric signal.

The ink jet recording head 20 is, as shown in the exploded perspective view in FIG. 6, constructed of a recording element unit 300 and a tank holder unit 200. Further, as illustrated in the exploded perspective view in FIG. 7, the recording element unit 300 is constructed of a recording element substrate 330, a first plate 310, an electric wiring board 340 and a second plate 320. Further, the tank holder unit 200 is constructed of a tank holder 210 serving as a contained holding member, a flow path forming member 220, a filter 230 and a seal rubber 240.

(1-1) Recording Element Unit

FIG. 8 is a perspective view with some portion cut off in order to illustrate a configuration of the recording element substrate 330. In the recording element substrate 330, a thin film (layer) is formed of a silicon substrate 331 that is, e.g., 0.5 mm to 1 mm in thickness. Moreover, there are formed six rows of ink supply ports 332 configured by elongate channel-like through-ports serving as flow paths for six color inks, and electro-thermal converting elements 333 are arrayed row by row in a cross pattern on both sides of each ink supply port 332. The electro-thermal converting element 333 and an electric wire of Al, etc. for supplying the electro-thermal converting element 333 with electric power are formed by a film forming technology. Further, a bump 335 of Au, etc. is provided on an electrode portion 334 for supplying the electric wire with the electric power. Formation of the ink supply port 332 involves effecting anisotropic etching by utilizing crystal orientations of the silicon substrate 331. If a crystal orientation <100> is given on a wafer surface and a crystal orientation <111> is given in a thickness wise direction, etching at an angle of approximately 54.7 degree advances based on the anisotropic etching of alkaline series (KOH, TMAH, hydrazine, etc.). The etching to a desired depth is attained by utilizing this method. Further, an ink flow path wall 336 for forming the ink flow path corresponding to the electro-thermal converting element 333 and a discharge port 337 are formed by a photolithography technique in the silicon substrate 331, and six discharge port trains 338 corresponding to the six color inks are formed. Moreover, the electro-thermal converting element 333 is provided facing the discharge port 337, through which the ink supplied from the ink supply port 332 is discharged in such a way that the electro-thermal converting element 333 produces an air bubble.

The first plate 310 is composed of a material of, for instance, aluminum ($Al_2O_3$) having a thickness of 0.5 mm to 10 mm. The material of the first plate 310 is not limited to alumina. The first plate 310 may be composed of a material exhibiting a linear expansion coefficient equal to a linear expansion coefficient of the material for the recording element substrate 330 and a thermal conductivity equal to or larger than a thermal conductivity of the material of the recording element substrate 330. The material of the first plate 310 may be any one of, for example, silicon (Si), aluminum nitride (AlN), zirconium oxide ($ZrO_2$), silicon nitride ($Si_3N_4$), silicon carbide (SiC), molybdenum (Mo) and tungsten (W). The first plate 310 is formed with six pieces of ink supply ports 311 for supplying the six color inks to the recording element substrate 330. The six ink supply ports 332 of the recording element substrate 330 correspond respectively to six pieces ink supply ports 311 in the first plate 310, and the recording element substrate 330 is fixedly bonded with a high positional accuracy to the first plate 310. A first bonding agent used for bonding is coated substantially in a shape of the recording element substrate over the first plate 310 so that none of air paths are formed between the ink supply ports adjacent to each other. A desirable bonding agent as the first bonding agent is, for instance, low of its viscosity and thin of a bonding layer formed on a contact surface, and exhibits comparatively high hardness after being hardened and ink resistance as well. The first bonding agent is a thermosetting bonding agent composed mainly of, e.g., an epoxy resin, and it is desirable that a thickness of the bonding layer be equal to or smaller than 50 μm.

The electric wiring board 340 serves to apply a signal voltage for discharging the ink to the recording element substrate 330. The electric wiring board 340 includes an aperture portion through which the recording element substrate 330 is built in, an electrode terminal (unillustrated) corresponding to the electrode portion 334 of the recording element substrate 330, and an external signal input terminal 341 disposed at an end portion of this wire and serving to receive the electric signal from the body apparatus. The electric wiring board 340 and the recording element substrate 330 are electrically connected to each other. A connection method thereof is that, for example, after coating a thermosetting bonding resin over between the electrode portion 334 of the recording element substrate 330 and the electrode terminal of the electric wiring board 340, the electrode portion 334 of the recording element substrate 330 and the electrode terminal of the electric wiring board 340 are batchwise heated and simultaneously pressurized by a heat tool, and the thermosetting bonding resin is thus hardened, whereby the electrode portion 334 and the electrode terminal are electrically batchwise connected. Further, in the case of using an anisotropic conductive bonding agent containing conductive particles, the thermosetting bonding resin is likewise available. The material of the electric wiring board 340 involves using, for instance, a flexible wiring board having a 2-layered wiring structure in which a surface layer is covered with a resist film. Moreover, a reinforcing plate is bonded to the back surface of the external signal input terminal 341, thereby improving planarity of the portion of the external signal input terminal 341. A material of the reinforcing plate involves the use of heat resistive materials such as glass epoxy, aluminum, etc. that are each 0.5 mm to 2 mm in plate thickness.

The second plate 320 is formed of a material of, for instance, aluminum ($Al_2O_3$) having a thickness of 0.5 mm to 1 mm. It should be noted that the material of the second plate 320 is not limited to aluminum. The second plate 320 may be composed of a material exhibiting a linear expansion coefficient equal to a linear expansion coefficient of each of the materials for the recording element substrate 330 and the first plate 310 and also exhibiting a thermal conductivity equal to or larger than a thermal conductivity of each of the substrate 330 and the plate 310. Then, the second plate 320 takes a configuration having an aperture portion larger than a dimension of an external configuration of the recording element substrate 330 fixedly bonded to the first plate 310. Further, the recording element substrate 330 and the electric wiring board 340 are boned to the first plate 310 by a second bonding agent so that the substrate 330 and the board 340 can be electrically connected in plane, and the back surface of the electric wiring board 340 is fixedly bonded by a third bonding agent. Moreover, the electric wiring board 340, which is bonded to the second plate 320, is at the same time bent at one side surfaces of the first plate 310 and of the second plate 320 and thus bonded to the side surface of the first plate 310 by the third bonding agent. A bonding agent usable as the second bonding agent is, for instance, low of its viscosity and thin of a bonding layer formed on a contact surface, and exhibits ink resistance. Further, the third bonding agent involves using a thermosetting bonding film composed mainly of, e.g., an epoxy resin and having a thickness of 10 to 100 μm.

The electric connecting portions between the recording element substrate 330 and the electric wiring board 340 of the thus constructed recording element unit 300, are sealed by a first sealing agent and a second sealing agent and thus protected from corrosion due to the inks and from an external impact. The first sealing agent seals mainly an outer peripheral portion of the recording element substrate 330, while the second sealing agent seals an edge of the aperture portion of the electric wiring board 340. Moreover, the bent electric wiring board 340 is further subjected to forming in accordance with a shape of the tank holder unit 200.

(1-2) Tank Holder Unit

The tank holder 210 is formed by, e.g., molding of a resin. It is desirable to use, as this resinous material, a resinous material mixed with 5% to 40% of a glass filler in order to improve a configurational rigidity. The tank holder 210 holds the detachable/attachable ink tanks 40, and has tank positioning pins, tank positioning holes, i.e., a first hole, a second hole and a third hole with which a first pawl, a second pawl and a third pawl are respectively engaged, and an aperture portion for a prism employed for detecting an ink residual amount. Further, the tank holder 210 includes an installation guide for guiding the recording head cartridge 10 to an installing position of the carriage of the ink jet recording apparatus body, an engagement portion for fixedly installing the recording head cartridge 10 into the carriage by use of s head set lever, and X-, Y- and Z-abutting portions for positioning in a predetermined installing position of the carriage. Moreover, the tank holder 210 has a terminal fixing portion for positioning and thus fixing the portion of the external signal input terminal 341 of the recording element unit 300, a plurality of ribs are provided on the terminal fixing portion and along its periphery, thereby strengthening rigidity of the surface including the terminal fixing portion. Further, color-separation ribs for preventing the respective colors from being intermingled each other are provided in color-separation spaces in which the respective ink tanks 41, 42, 43, 45 and 46 are installed. Moreover, finger anti-slip portions are provided on the side surfaces of the tank holder 210, thereby improving a handling property of the ink jet recording head 20. Further, as shown in FIG. 7, the tank holder 210 is formed with an ink flow path 214 for guiding the ink to the recording element unit 300 from the ink tank 40, wherein the ink flow path 214 is one component of the tank holder unit 200 and was, according to the prior art, formed by ultrasonic-welding the flow path forming member 220. Furthermore, a filter 230 for preventing dusts from entering from outside is joined by thermal welding to a joint portion engaging with the ink tank 40, and a seal rubber 240 for preventing evaporation of the ink from the joint portion is attached.

(1-3) Connection of Recording Element Unit and Tank Holder Unit

As shown in FIG. 6, the ink jet recording head 20 is completed by connecting the recording element unit 300 to the tank holder unit 200. The connection is conducted in the following manner. A portion of the ink supply port (the ink supply port 311 of the first plate 310) of the recording element unit 300 and a portion of the ink supply port (the ink flow path 224 of the flow path forming member 220), are fixedly bonded by coating a fourth bonding agent over there so that these ink supply ports communicate with each other. Further, other than the portions of the ink supply ports, several portions at which the recording element unit 300 and the tank holder unit 200 abut on each other, are fixedly bonded by a fifth bonding agent. Desirable bonding agents as the fourth and fifth bonding agents exhibit the ink resistance, get hardened at a normal temperature and are flexible enough to withstand a linear expansion difference between different types of materials. According to the present embodiment, for example, a moisture absorption hardening type silicon bonding agent is used. Furthermore, the fourth bonding resin and the fifth bonding resin may be the same bonding agent. Moreover, when bonding the recording element unit 300 to the tank holder unit 200 with the fourth and fifth bonding agents, the recording element unit 300 is positioned and thus fixed by use of a sixth bonding agent. It is desirable that the sixth bonding agent be instantaneously hardened. According to the present embodiment, for instance, an ultraviolet-ray hardening bonding agent is employed, however, other bonding agents may also be available.

A portion of the external signal input terminal 341 of the recording element unit 300 is positioned and thus fixed to one side surface of the tank holder 210 by use of terminal positioning pins (two pieces) and terminal positioning holes (two pieces). A fixing method is, for instance, such that a terminal connection pin provided on the tank holder 210 is fitted into a terminal connection hole provided in the periphery of the external signal input terminal 341 of the electric wiring board 340, and the fixation is attained by terminally welding the terminal connection pin. Other fixing means may, however, be usable.

(2) Description of Recording Head Cartridge

FIG. 9 illustrates the way of installing the ink jet recording head 20 constituting the recording head cartridge 10 and the ink tanks 41, 42, 43, 44, 45, 46. Referring to FIG. 9, the ink tanks 41, 42, 43, 44, 45, 46 contain the inks assuming the colors corresponding to the respective tanks. Further, the individual ink tanks 40 are formed with ink supply ports 401 for supplying the ink jet recording head 20 with the inks contained in the ink tanks. For example, the ink tank 41 is formed with the ink supply port 401 through which the black ink in the ink tank 41 is supplied to the ink jet recording head 20 in the state where the ink tank 41 is installed in the ink jet recording head 20.

Figure 10:
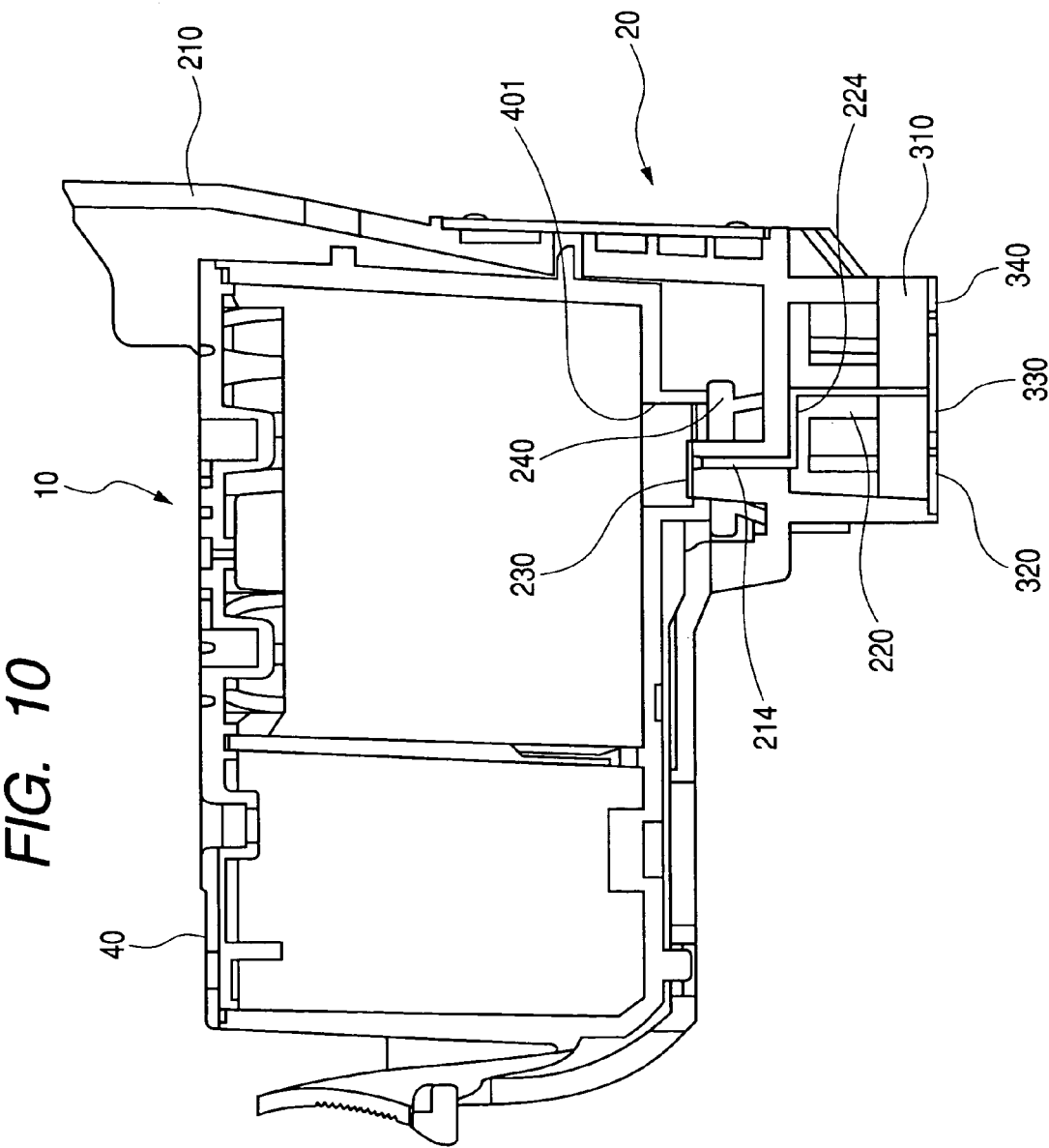
FIG. 10 is a schematic sectional view of the recording head cartridge.

FIG. 10 is a sectional view of the recording head cartridge 10. Referring to FIG. 10, the recording element substrate 330 is provided on one side portion of the undersurface of the box-shaped ink jet recording head 20. Further, the ink jet recording head 20 is, as described above, provided with the joint portion. The joint portion is formed with the ink flow path 214 extending toward the recording element substrate 330. A flow of the ink in the thus-constructed recording head cartridge 10 will be explained in a way that exemplifies the ink tank 41 for the black ink. The ink in the ink tank 41 is supplied to the interior of the ink jet recording head 20 via the ink supply port 401 of the ink tank 41 and via the joint portion. The ink supplied to the interior of the ink jet recording head 20 is further supplied to the first plate 310 of the recording element unit 300 via the ink flow path 214 within the tank holder 210 and via the ink flow path 224 within the flow path forming member 220. Then, the ink is supplied to the ink supply port 332 of the recording element substrate 330 from the first plate 310 and further to a bubbling chamber accommodating the electro-thermal converting elements 333 and the discharge ports 337 of the recording element substrate 330. The ink supplied to the bubbling chamber is discharged out of the discharge ports 337 toward a recording sheet defined as a recorded medium by dint of thermal energy generated by the electro-thermal converting elements 333.

First Embodiment of the Present Invention

Next, the construction and features of the ink jet recording head according to a first embodiment of the present invention, will be described with reference to FIGS. 1 through 4C. In the thus-constructed ink jet recording head 20 in the first embodiment of the present invention, the tank holder 210 itself is molded of a resin containing a dye stuff or a pigment that absorbs the laser beams in order to dispose a non-transmissive material that does not transmit the laser beams in a junction surface area between the flow path forming member 220 for forming the ink flow path 224 and the tank holder 210. On the other hand, the flow path forming member 220 is molded of a resin that transmits the laser beams, and only a junction surface 223 of the flow path forming member 220 is a protruded portion taking a protruded shape unlike other non-junction surfaces. Further, all the junction surfaces formed on the tank holder 210 and in the periphery of the portion formed with the liquid flow path of the flow path forming member 220, take the same planar shape.

According to the first embodiment, concretely, the material used for the flow path forming member is a transparent material that transmits the laser beams and exhibits excellency in terms of the ink resistance. This material is transparent Noryl [TPN9221] of [GE Plastics] (General Electric International Inc.). Further, black Noryl [SE1X] is adopted as a material of the tank holder. A material of the flow path forming member can also involve using transparent Noryl [TN300].

Note that Noryl herein connotes modified polyphenylene ether or modified polyphenylene oxide. Noryl is a resin developed by the General Electric International Inc. given above and is a material acquired by modifying polyphenylene ether (polyphenylene oxide). Noryl belongs to a category of thermoplastic resins and has a highly resistive property against acid and alkaline. Transparent Noryl described above is Noryl containing none of color materials.

According to the first embodiment, the ink flow path 224 is formed in the flow path forming member 220, and a sectional configuration of the ink flow path 224 is substantially a rectangle of which one side corresponds to the tank holder 210 in the connected state.

The following is a description of how the ink jet recording head in the first embodiment of the present invention is constructed. In the aforementioned ink jet recording head, as shown in FIG. FIGS. 1, 3A and 4A, after the flow path forming member 220 has been attached to the tank holder 210 in an arrow direction, the flow path forming member 220 is, as illustrated in FIGS. 2, 3B and 4B, pressed by a press jig 53 having transmissivity of the laser beams, thereby hermetically connecting the junction surfaces together. Thereafter, a laser irradiation machine 51 irradiates the resin mold forming the tank holder 210 with the laser beams, with the result that the laser-beam-absorptive dye stuff or pigment contained in the resin mold emits the heat to melt the resin. The heat emitted at this time exothermically melts also the flow path forming member 220, whereby the junction surface 223 in the periphery of the ink flow path 224 is connected by welding as shown in FIG. 4C. Note that a holder receiving board 52 in FIGS. 3A and 3B is a board for sustaining the tank holder 210 when melting the flow path forming member to the tank holder.

Herein, the flow path forming member 220, as only the junction surface thereof takes the protruded shape unlike other non-junction surfaces, improves its hermetic connectivity. Then, the melting heat of the exothermic resin of the tank holder 210 is efficiently transferred to the mold resin of the flow path forming member 220, whereby the tank holder 210 and the flow path forming member 220 can be melted and connected to each other. A melted portion 228 is produced on the welded surface between the tank holder 210 and the flow path forming member 224, however, a large burr as seen in the prior art does occur in the ink flow path 224.

Further, all the junction surfaces formed on the tank holder 210 and in the periphery of the portion formed with the liquid flow path of the flow path forming member 220, take the same planar shape, and hence, when a distance between a light source of the laser beams and the junction surface portion is set fixed, the periphery of the liquid flow path can be all welded, thereby enabling the manufacturing costs to be decreased.

According to the first embodiment, as described above, the material of the flow path forming member involves the use of transparent Noryl given above. In the case of other ink resistive resin such as a PPS (polyphenylenesulfide) material, however, this material does not well transmit the laser beams, a junction strength of the welded portion between the tank holder and the flow path forming member was insufficient, and a sufficient mechanical strength of the flow path forming member was not acquired. Moreover, the majority of other resins such as an ABS resin and polycarbonate having such a grade as to exhibit high laser beam transmissivity, which are, i.e., suited to the laser welding, were conversely inferior in terms of the ink resistance and insufficient as the materials of the flow path forming member.

By contrast, in the case of utilizing transparent Noryl given above as the material of the flow path forming member, the transparent Noryl well transmits the laser beams, and therefore the tank holder and the flow path forming member could be welded together at the sufficiently preferable junction strength. Besides, the sufficient mechanical strength of the flow path forming member was acquired. Further, the sufficient ink resistance was obtained.

Second Embodiment of the Present Invention

Next, a construction and features of the ink jet recording head according to a second embodiment of the present invention will be explained with reference to FIGS. 11A, 11B and 1C. FIGS. 11A, 11B and 11C are schematic side surface partial sectional views showing a step of connecting the flow path forming member to the tank holder of the ink jet recording head in the second embodiment of the present invention. FIG. 11A shows a relative relationship between the tank holder and the flow path forming member before the connection. FIG. 11B shows a state in which the flow path forming member is irradiated with the laser beam in a way that abuts the flow path forming member on the tank holder. FIG. 11C shows a connected state. The same members as those in the first embodiment are marked with the same reference numerals.

In FIGS. 11A to 11C, the materials composing the flow path forming member 220 and the tank holder 211 are the same as those in the first embodiment. In the first embodiment, only the junction surface 223 of the flow path forming member 220 is formed as the protruded portion taking the protruded shape unlike other non-junction surfaces. According to the second embodiment, however, in both of the tank holder 211 and the flow path forming member 220, respective junction surfaces 216 and 223 thereof are formed as protruded portions each taking the protruded shape unlike other non-junction surfaces.

In the second embodiment also, the ink flow path 224 is formed in the flow path forming member 220, and a sectional configuration of the ink flow path 224 is substantially a rectangle of which one side corresponds to the tank holder 211 in the connected state.

The following is a description of how the ink jet recording head in the second embodiment of the present invention is constructed. In the aforementioned ink jet recording head, as shown in FIG. 11A, after the flow path forming member 220 has been attached to the tank holder 211 in an arrow direction, the flow path forming member 220 is, as illustrated in FIG. 11B, pressed by the press jig 53 having the transmissivity of the laser beams, thereby hermetically connecting the junction surfaces together. Thereafter, the laser irradiation machine 51 irradiates the resin mold forming the tank holder 211 with the laser beams, with the result that the laser-beam-absorptive dye stuff or pigment contained in the resin mold emits the heat to melt the resin. The heat emitted at this time exothermically melts also the flow path forming member 220, whereby the junction surfaces 216, 223 in the periphery of the ink flow path 224 are connected by welding as shown in FIG. 11C.

Herein, the tank holder 211 and the flow path forming member 220, as only the junction surfaces thereof take the protruded shapes unlike other non-junction surfaces, improve their hermetic connectivity. Then, the melting heat of the exothermic resin of the tank holder 211 is efficiently transferred to the mold resin of the flow path forming member 220, whereby the tank holder 211 and the flow path forming member 220 can be melted and connected to each other.

Third Embodiment of the Present Invention

Next, a construction and features of the ink jet recording head according to a third embodiment of the present invention will be explained with reference to FIGS. 12A, 12B and 12C. FIGS. 12A, 12B and 12C are schematic side surface partial sectional views showing a step of connecting the flow path forming member to the tank holder of the ink jet recording head in the third embodiment of the present invention. FIG. 12A shows a relative relationship between the tank holder and the flow path forming member before the connection. FIG. 12B shows a state in which the flow path forming member is irradiated with the laser beam in a way that abuts the flow path forming member on the tank holder. FIG. 12C shows a connected state. The same members as those in the first embodiment are marked with the same reference numerals.

In FIG. 12, the materials composing a flow path forming member 221 and a tank holder 212 are the same as those in the first embodiment. Further, as in the first embodiment, only a junction surface 223 of the flow path forming member 221 is formed as the protruded portion taking the protruded shape unlike other non-junction surfaces.

In the first and second embodiments, the ink flow path 224 is formed in the flow path forming member 220, and a sectional configuration of the ink flow path 224 is substantially a rectangle of which one side corresponds to the tank holder 212 in the connected state. According to the third embodiment, the tank holder 212 and the flow path forming member 221 are formed respectively with ink flow paths 214 and 225 each taking a semi-circular shape, wherein an ink flow path 215 taking a circular shape in section in the connected state is configured and shows a symmetrical shape in section with respect to the junction surface 223 as a central surface. As shown in FIG. 12A, after the flow path forming member 221 has been attached to the tank holder 212 in an arrow direction, the flow path forming member 221 is, as illustrated in FIG. 12B, pressed by the press jig 53 having the transmissivity of the laser beams, thereby hermetically connecting the junction surfaces together. Thereafter, the laser irradiation machine 51 irradiates the resin mold forming the tank holder 212 with the laser beams, with the result that the laser-beam-absorptive dye stuff or pigment contained in the resin mold emits the heat to melt the resin. The heat emitted at this time exothermically melts also the flow path forming member 221, whereby the junction surfaces in the periphery of the ink flow path 215 are connected by welding as shown in FIG. 12C.

Herein, as only the junction surface of the flow path forming member 221 takes the protruded shape unlike other non-junction surfaces, the hermetic connectivity between the tank holder 212 and the flow path forming member 221 is improved. Then, the melting heat of the exothermic resin of the tank holder 212 is efficiently transferred to the mold resin of the flow path forming member 221, whereby the tank holder 212 and the flow path forming member 221 can be melted and connected to each other.

Moreover, the ink flow paths formed in the tank holder 212 and the flow path forming member 221 take the semi-circular shape in section and show the symmetrical shape in section with respect to the junction surface as the central surface. Accordingly, the combined ink flow path assumes substantially the circular shape in section, whereby the ink flow path 215 with no stagnated portion can be formed.

Figure 13A:
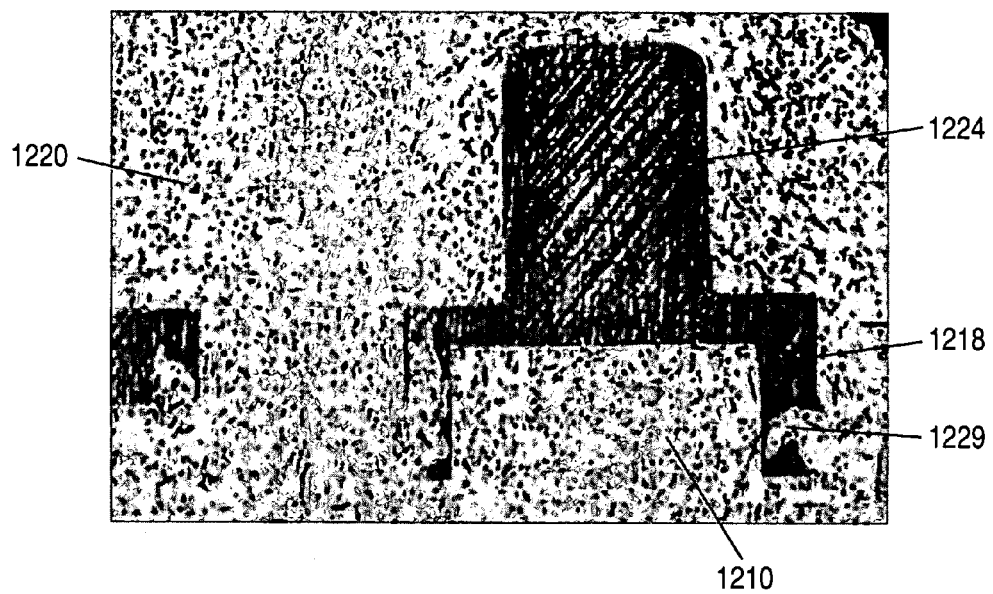
FIG. 13A is a sectional photo of an ink flow path when cut in a direction vertical to a direction in which a liquid flows within the ink flow path formed by utilizing conventional ultrasonic wave welding.
Figure 13B:
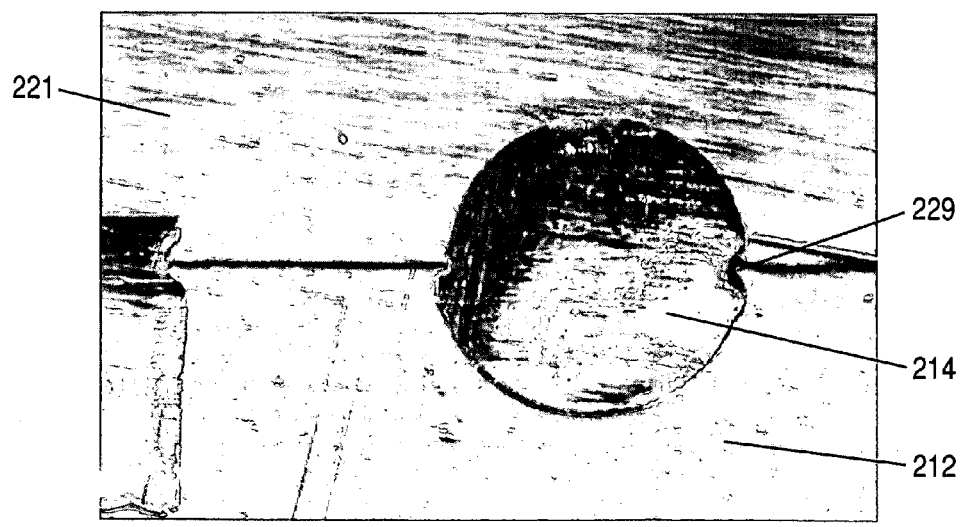
FIG. 13B is a sectional photo of the ink flow path when cut in a direction vertical to the direction in which the liquid flows within the ink flow path formed by utilizing laser welding in the present embodiment.

Interiors of the ink flow paths of the respective tank holder unit assembled by the conventional ultrasonic wave welding and by the laser welding in the third embodiment were solidified by a resin, cut and polished, and sections of the ink flow paths were observed. FIG. 13A and FIG. 13B respectively show microscopic photos thereof.

FIG. 13A shows the section of the ink flow path formed by the ultrasonic wave welding as the conventional method.

An example by the conventional method is that, the ultrasonic wave welding property being taken into consideration, the flow path forming member and the tank holder are formed of the same resinous material, and black Noryl [PCN2910] of [GE Plastics] (General Electric International Inc.) is adopted as a material exhibiting the excellency of the ink resistance.

As can be recognized from the sectional photo in FIG. 13A, it is observed that pointed prickled burrs 1229 occur due to the ultrasonic wave vibrations when welding, and a glass filler having a diameter of 13 μm, which is added to the plastic also projects and is on the verge of falling out.

The reason for this is that when the flow path forming member 1220 is welded to the tank holder 1210, the two members rub against each other due to the ultrasonic wave vibrations, and the resin melted by the friction heat and the glass filler, etc. contained in the resin are scattered over the contact portion.

Further, a large amount of melted burrs 1229 are generated in the ultrasonic wave welding, and hence there is a necessity of providing an extensive burr reservoir portion 1218 so that the melted burrs do not largely extend over the ink flow path 1224, and this becomes the ink stagnated portion. The dusts occurred when in the ultrasonic wave welding are easy to stagnate and are very hard to be removed in a subsequent washing step.

FIG. 13B shows a sectional photo of the tank holder unit when cut in a direction vertical to the liquid flowing direction within the ink flow path formed by utilizing the laser welding in the present example.

Even in the case of the laser welding, a welding burr 229 is formed slightly. As the flow path forming member 221 is just pressed against the tank holder 212, a welding burr 229 takes a small round protruded shape protruding from the junction surface, and the ink flow path 214 is substantially circular in sectional shape. Thus, the welding burr 229 assuming the small round protruded shape does not easily fall out, and it is therefore possible to remarkably reduce the dusts generated when assembled.

Then, the laser-welding-based formation of the ink flow path involves a small amount of melted burrs generated, and hence it is feasible to eliminate the burr reservoir that turns out to be the ink stagnated portion, which was indispensable for the assembly based on the ultrasonic wave welding.

Figure 14:
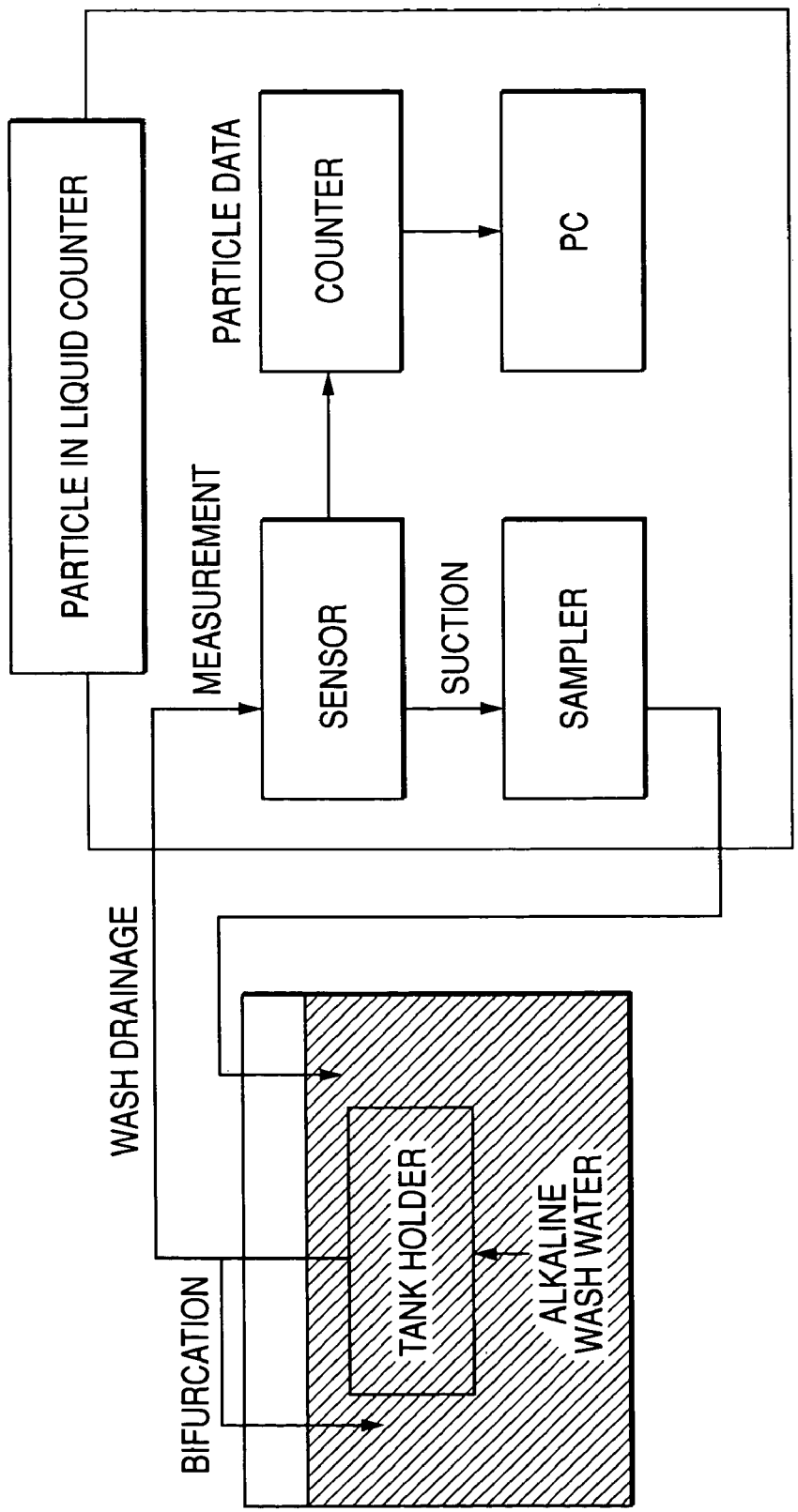
FIG. 14 shows a conceptual diagram of an in-liquid particle measuring apparatus.

For verifying an effect that the tank holder unit formed by the laser welding has a smaller and less amount of generated dusts than by the tank holder unit formed by the conventional ultrasonic wave welding, the ink flow paths of the tank holder units assembled by the ultrasonic wave welding and by the laser welding are washed by alkaline wash water of a PH of 11.0, and the dusts contained in the wash drainage water are observed by an particle in-liquid counter made by Rion Inc. FIG. 14 shows a conceptual diagram of the in-liquid particle measuring apparatus.

The number of dusts is measured (counted) such that part (25 cc/min) of the wash drainage water flowing at a rate of approximately 4.5 l/min, which has been bifurcated from a drainage hose of a wash jig, is introduced into the particle in-liquid counter, and a 1-sec dust count is detected at an interval of 3 sec on a time base for one minute since the washing was started.

Table 1 shows a comparison in total value between the dust counts of the dusts generated in the tank holder unit formed based on the ultrasonic wave welding shown in FIG. 13A and in the tank holder unit formed based on the laser welding according to the third embodiment shown in FIG. 13B.

TABLE 1

| Particle Size of Dust | Ultrasonic Wave Welding | Laser Welding |
| --- | --- | --- |
| Less than 2 μm | 846 pieces | 742 pieces |
| Equal to or larger than 2 μm but less than 5 μm | 92 pieces | 83 pieces |
| Equal to or larger than 5 μm but less than 10 μm | 5 pieces | 0 |
| Equal to or larger than 10 μm but less than 15 μm | 1 piece | 0 |
| Equal to or larger than 15 μm but less than 20 μm | 0 | 0 |
| Equal to or larger than 20 μm but less than 25 μm | 0 | 0 |

The dust count of the dusts less than 5 μm in the laser welding is smaller by approximately 10% than in the ultrasonic wave welding. Further, none of the dusts having a particle size equal to or larger than 5 μm are recognized in the laser welding, whereas in the ultrasonic wave welding the dusts having a particle size equal to or larger than 5 μm but less than 15 μm are recognized.

It can be understood from this comparison that the dust generation can be made less by assembling the tank holder unit based on the laser welding than by the assembly based on the conventional ultrasonic wave welding step.

On the other hand, a tendency over the recent years is that an areal size of the discharge port for discharging the ink is decreased for reducing a volume of a liquid droplet discharged from the recording head as a method for performing the high-definition ink jet record. As a minimum diameter of the discharge port becomes smaller, a defective discharge caused by the discharge port which is clogged by the dusts in the ink flow path becomes easier to occur. Therefore, according to the experimental result given above, the formation of the liquid flow path based on the laser welding of the present invention can be, it is understood, preferably utilized in the case of using the recording head having the discharge port of which the minimum diameter is equal to or larger than 5 μm but less than 15 μm, especially the recording head having the discharge port of which the minimum diameter is equal to or larger than 5 μm but less than 10 μm.

Fourth Embodiment of the Present Invention

Figure 15C:
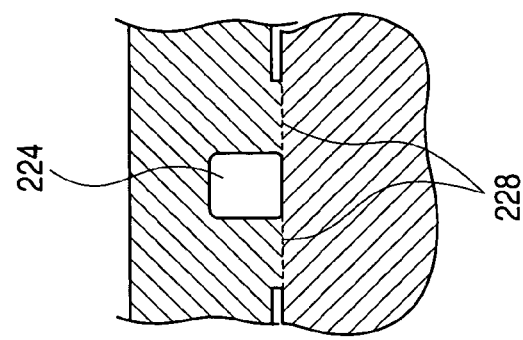
FIGS. 15A, 15B and 15C are schematic side surface partial sectional views showing a step of connecting the flow path forming member to the tank holder of the ink jet recording head in a fourth embodiment of the present invention.
Figure 15B:
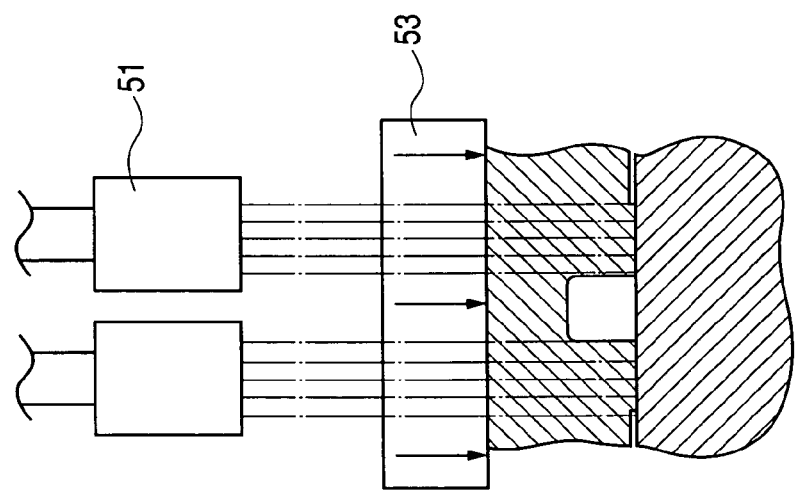
Figure 15A:
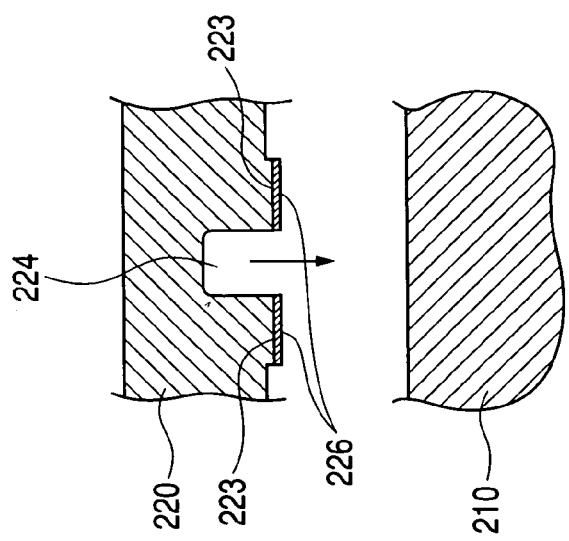
Figure 17:
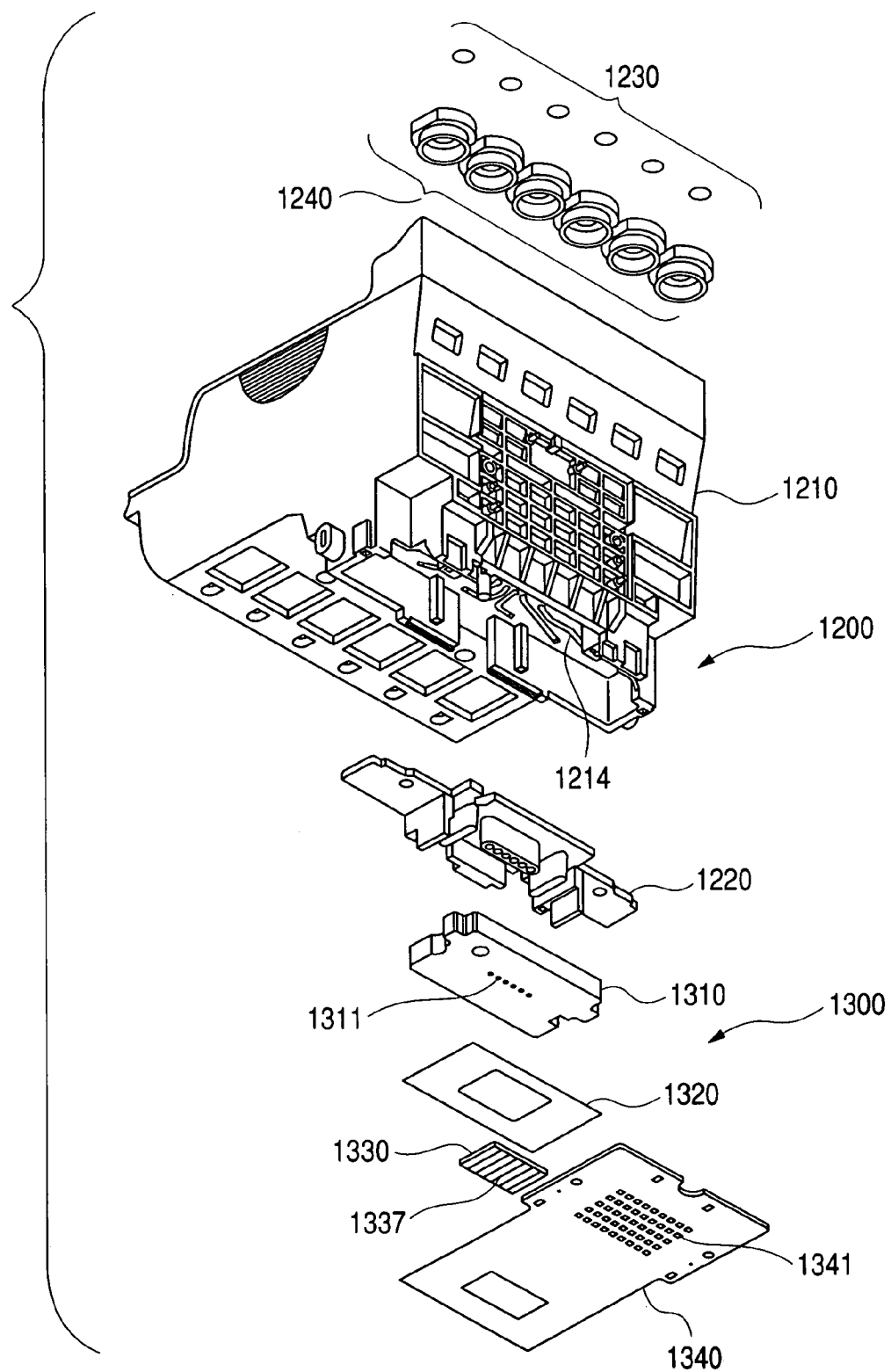
FIG. 17 is an exploded perspective view for explaining a construction of an ink jet recording head in the prior art.
Figure 18:
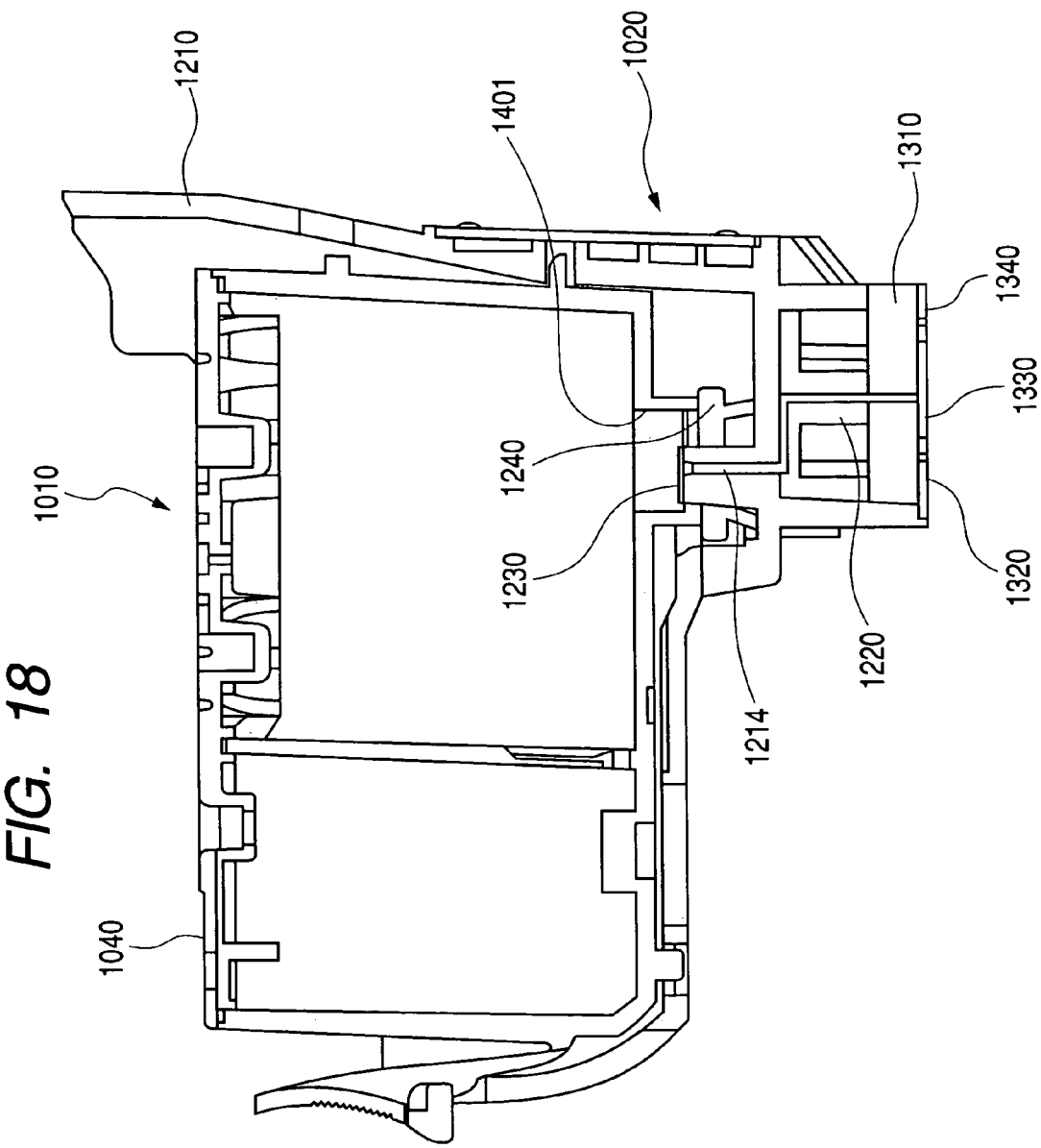
FIG. 18 is a cross sectional view of a recording head cartridge in which an ink tank is installed in the ink jet recording head in the prior art.
Figure 19A:
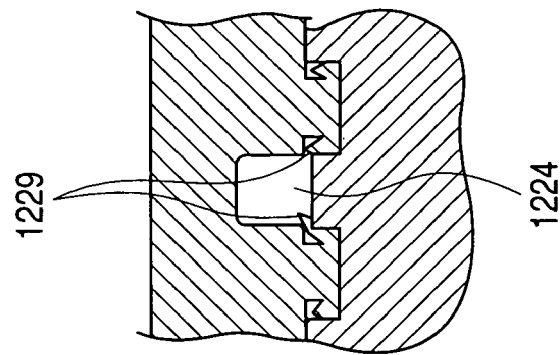
FIGS. 19A, 19B and 19C are schematic side surface partial sectional views showing a step of connecting the flow path forming member to the tank holder of the ink jet recording head in the prior art.
Figure 19B:
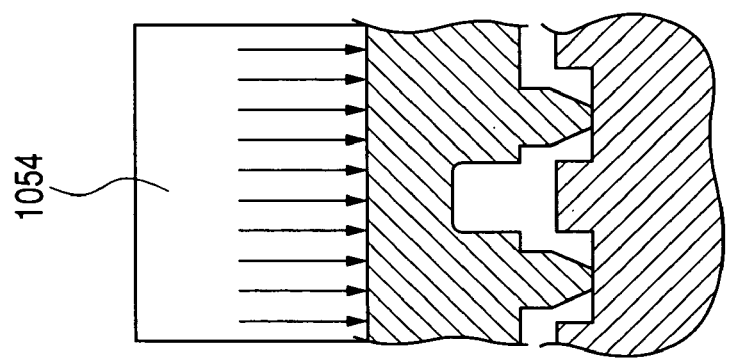
Figure 19C:
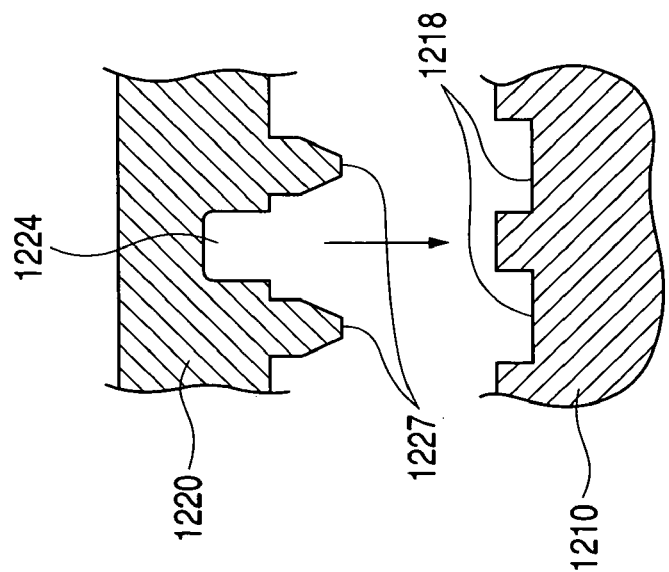

Next, a construction and features of the ink jet recording head according to a fourth embodiment of the present invention will be explained with reference to FIGS. 15A, 15B and 15C. FIGS. 15A, 15B and 15C are schematic side surface partial sectional views showing a step of connecting the flow path forming member to the tank holder of the ink jet recording head in the fourth embodiment of the present invention. FIG. 15A shows a relative relationship between the tank holder and the flow path forming member before the connection. FIG. 15B shows a state in which the flow path forming member is irradiated with the laser beam in a way that abuts the flow path forming member on the tank holder. FIG. 15C shows a connected state. The same members as those in the first embodiment are marked with the same reference numerals.

In FIGS. 15A to 15C, the tank holder 210 as well as the flow path forming member 220 are molded of transparent Noryl of the General Electric International Inc. that is used as a material of the flow path forming member 220 in each of the embodiments discussed above.

Further, as in the first embodiment, only the junction surface 223 of the flow path forming member 220 is formed as the protruded portion taking the protruded shape unlike other non-junction surfaces.

According to the fourth embodiment, a laser beam absorptive coating material 226 having no transmissivity of the laser beams is coated over the junction surface 223 so that a non-transmissive material is disposed in a junction surface area with the tank holder 210 for forming the ink flow path 224.

According to the fourth embodiment, as in the first and second embodiments, the ink flow path 224 is formed in the flow path forming member 220, and a sectional configuration of the ink flow path 224 is substantially a rectangle of which one side corresponds to the tank holder 210 in the connected state.

After the laser beam absorptive coating material 226 composed of a coating material or a pigment that absorbs the laser beams has been, as shown in FIG. 15A, coated over the junction surface 223 of the flow path forming member 220, the flow path forming member 220 is attached to the tank holder 210 in an arrow direction. Thereafter, as shown in FIG. 15B, the flow path forming member 220 is pressed by the press jig 53 having the transmissivity of the laser beams, thereby hermetically connecting the junction surfaces together. Thereafter, the laser irradiation machine 51 emits the laser beams, with the result that the laser beam absorptive coating material 226 coated over the junction surface of the flow path forming member 220 emits the heat. Then, the resins of the tank holder 210 and of the flow path forming member 220, which are brought into contact with the laser beam absorptive coating 226, are also exothermically melted, whereby the junction surface 223 in the periphery of the ink flow path 224 is connected by welding as shown in FIG. 15C.

Herein, as only the junction surface of the flow path forming member 220 takes the protruded shape unlike other non-junction surfaces, the laser beam absorptive coating material can be coated over only the junction surface, and the exothermic laser beam absorptive coating material emits the heat only on the junction surface between the mold resin of the tank holder 210 and the mold resin of the flow path forming member 220. These mold resins are thereby melted each other and can be connected through residuals of the laser beam absorptive coating material.

According to the fourth embodiment, the tank holder 210 and the flow path forming member 220 can be formed of the same resin, and it is possible to avoid an influence caused due to a difference in thermal expansion between the resins at the junction surfaces.

The description in the fourth embodiment is that only the junction surface of the flow path forming member 220 takes the protruded shape, however, the junction surface of the tank holder 210 or the junction surfaces of the both may also be formed in the protruded shape. In this case, the laser beam absorptive coating material may be coated over the junction surface of the tank holder 210.

Fifth Embodiment of the Present Invention

Next, a construction and features of the ink jet recording head according to a fifth embodiment of the present invention will be explained with reference to FIGS. 16A, 16B and 16C. FIGS. 16A, 16B and 16C are schematic side surface partial sectional views showing a step of connecting the flow path forming member to the tank holder of the ink jet recording head in the fifth embodiment of the present invention. FIG. 16A shows a relative relationship between the tank holder and the flow path forming member before the connection. FIG. 16B shows a state in which the flow path forming member is irradiated with the laser beam in a way that abuts the flow path forming member on the tank holder.

FIG. 16C shows a connected state. The same members as those in the first embodiment are marked with the same reference numerals.

In FIGS. 16A to 16C, the flow path forming member 220 and the tank holder 211 are composed of the same materials as those in the first through third embodiments. Further, as in the second embodiment, only the junction surfaces of both of the tank holder 211 and the flow path forming member 220 are protruded surfaces taking the protruded shape unlike other non-junction surfaces. Moreover, according to the fifth embodiment, as in the first, second and fourth embodiments, the ink flow path 224 is formed in the flow path forming member 220, and a sectional configuration of the ink flow path 224 is substantially a rectangle of which one side corresponds to the tank holder 211 in the connected state. In the fifth embodiment, the protruded surface serving as the junction surface of the tank holder 211 is a junction surface 217 subjected to a roughing surface treatment of making the surface rougher than other non-junction surfaces.

After the flow path forming member 220 has been attached to the tank holder 211 in an arrow direction as shown in FIG. 16A, the flow path forming member 220 is pressed by the press jig 53 having the transmissivity of the laser beams as shown in FIG. 16B, thereby hermetically connecting the junction surfaces together. Thereafter, the laser irradiation machine 51 emits the laser beams, with the result that the laser-beam-absorptive dye stuff or pigment contained in the resin mold forming the tank holder 211 emits the heat to melt the resin. The heat emitted at this time exothermically melts also the flow path forming member 220, whereby the junction surfaces 217, 223 in the periphery of the ink flow path 224 are connected by welding as shown in FIG. 16C.

Herein, in the tank holder 211 and the flow path forming member 220, only the junction surfaces 217, 223 thereof are the protruded surfaces taking the protruded shapes unlike other non-junction surfaces, and the junction surface 217 of the tank holder 211 is subjected to the roughing surface treatment for roughing the surface. Therefore, the roughed and elevated (protruded) surface contiguous to the flow path forming member 220 is melted in a short period of time, resulting in a melted contact surface of the flow path forming member 220. Then, the mold resins can be, with the roughed and elevated surface being centered, melted each other and firmly connected.

In above embodiments of the Present Invention, the flow path forming member is composed of a resin exhibiting transmissivity of laser beam. And by irradiating a periphery of the ink flow path with the laser beam from the side of the flow path forming member, the junction surface portion of the tank holder and the junction surface portion of the flow path forming member are welded.

It may be carried out, however, that the tank holder member is composed of a resin exhibiting transmissivity of laser beam, and the tank holder and the flow path forming member are welded by irradiating a periphery of the ink flow path with the laser beam from the side of the tank holder.

This application claims priority from Japanese Patent Application No. 2003-295314 filed Aug. 19, 2003, which is hereby incorporated by reference herein.

What is claimed is:

1. An ink jet recording head comprising:
  a container holding member to which a liquid accommodating container for accommodating a liquid is attached; and
  a flow path forming member connected to said container holding member, wherein a plurality of liquid flow paths communicating with said liquid accommodating container are formed between said container holding member and said flow path forming member that have been connected together, wherein at least one of said container holding member and said flow path forming member is formed with a recessed portion for forming said liquid flow path, wherein at least one of a junction surface portion of said container holding member and a junction surface portion of said flow path forming member has a protruded portion assuming a protruded shape from non-connected surfaces of said members having said junction surface portions, and wherein said flow path forming member is composed of a resin exhibiting transmissivity of laser beam, wherein a non-transmissive material exhibiting none of transmissivity of the laser beam exists in at least a junction area of said container holding member between said container holding member and said flow path forming member, wherein the non-transmissive material emits heat by irradiating a periphery of said ink flow path with the laser beam from the side of said flow path forming member in a state where said flow path forming member is pressure-welded to said container holding member, and wherein said junction surface portion of said container holding member and said junction surface portion of said flow path forming member are welded, thereby forming said liquid flow path; and wherein at least one of said junction surface portions has a laser beam absorptive agent heated when irradiated with the laser beam and melting said junction surface portion of said container holding member and said junction surface portion of said flow path forming member.

2. An ink jet recording head according to claim 1, wherein a material composing said flow path forming member is modified polyphenylene ether containing none of color materials.

3. An ink jet recording head according to claim 1, wherein said container holding member and said flow path forming member respectively have said protruded portions.

4. An ink jet recording head according to claim 1, wherein said liquid flow path takes substantially a circular shape in section vertical to a direction in which a liquid flows within said liquid flow path.

5. An ink jet recording head according to claim 1, further comprising a recording portion having a discharge port communicating with said liquid flow path and serving to discharge an ink, wherein a minimum diameter of said discharge portion is equal to or lager than 5 μm but less than 15 μm.

6. An ink jet recording head according to claim 5, wherein the minimum diameter of said discharge portion is equal to or larger than 5 μm but less than 10 μm.

7. An ink jet recording head according to claim 1, wherein a material composing said container holding member is modified polyphenylene ether containing none of color materials.

8. An ink jet recording head according to claim 1, wherein said container holding member is composed of said non-transmissive material.

* * * * *